(12) United States Patent
Ohyama et al.

(10) Patent No.: US 7,948,137 B2
(45) Date of Patent: May 24, 2011

(54) CORE, ROTOR, MOTOR AND COMPRESSOR

(75) Inventors: Kazunobu Ohyama, Shiga (JP); Shin Nakamasu, Shiga (JP); Yoshinari Asano, Shiga (JP); Toshinari Kondo, Shiga (JP); Keiji Aota, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 6 days.

(21) Appl. No.: 11/815,804

(22) PCT Filed: Jan. 26, 2006

(86) PCT No.: PCT/JP2006/301201
§ 371 (c)(1),
(2), (4) Date: Oct. 3, 2008

(87) PCT Pub. No.: WO2006/085440
PCT Pub. Date: Aug. 17, 2006

(65) Prior Publication Data
US 2009/0127962 A1 May 21, 2009

(30) Foreign Application Priority Data

Feb. 9, 2005 (JP) .................. 2005-032932
Apr. 21, 2005 (JP) .................. 2005-123740

(51) Int. Cl.
*H02K 21/14* (2006.01)
*H02K 21/12* (2006.01)
*H02K 1/22* (2006.01)

(52) U.S. Cl. ........... 310/156.53; 310/26.11; 310/156.56; 310/156.01; 310/156.25; 310/216.008; 310/216.025; 310/261.048

(58) Field of Classification Search .............. 310/261, 310/261.1, 156.01–156.65, 216.004, 216.008, 310/216.009, 216.013, 261.025, 216.026, 310/216.031, 216.048; *H02K 21/14, 21/12, H02K 1/22*
See application file for complete search history.

(56) References Cited

U.S. PATENT DOCUMENTS

| 4,127,786 A | * | 11/1978 | Volkrodt | 310/156.84 |
| 4,858,304 A | * | 8/1989 | Weldon et al. | 29/598 |
| 5,010,266 A | * | 4/1991 | Uchida | 310/156.22 |

(Continued)

FOREIGN PATENT DOCUMENTS

| JP | 05-236718 A | 9/1993 |
| JP | H08-251848 | 9/1996 |
| JP | 08-280145 A | 10/1996 |

(Continued)

OTHER PUBLICATIONS

Replacing Examination Report of corresponding Singapore Application No. 200705837-3 Dated Dec. 9, 2009.

Primary Examiner — Quyen Leung
Assistant Examiner — Terrance Kenerly
(74) Attorney, Agent, or Firm — Global IP Counselors

(57) ABSTRACT

A rotor includes a core extending in a predetermined direction, and a plurality of magnets. The core has parts formed by magnetic materials and extending in the predetermined direction. The parts are arranged in a loop around the part, and face the part through gaps. The magnets are buried in the gaps in the form of a loop in the core. The magnets have pole faces extending in the predetermined direction. In each of the magnets, at least one of ends of the magnet protrudes forward in parallel to the predetermined direction with respect to an end of the part that is on the same side with the at least one of the ends of the magnet.

31 Claims, 23 Drawing Sheets

U.S. PATENT DOCUMENTS

| | | |
|---|---|---|
| 6,008,559 A | 12/1999 | Asano et al. |
| 6,034,458 A * | 3/2000 | Uetake et al. ............ 310/156.49 |
| 6,675,460 B2 * | 1/2004 | Reiter et al. .................... 29/596 |
| 6,727,627 B1 * | 4/2004 | Sasaki et al. ................... 310/211 |
| 6,741,010 B2 * | 5/2004 | Wilkin .......................... 310/268 |
| 6,933,653 B2 * | 8/2005 | Fauth et al. ................. 310/261.1 |
| 7,362,025 B2 * | 4/2008 | Utaka ....................... 310/156.57 |
| 2002/0171309 A1 | 11/2002 | Wakui et al. |
| 2004/0145263 A1 * | 7/2004 | Kojima et al. ........... 310/156.23 |
| 2004/0256940 A1 * | 12/2004 | Tsuruta et al. ........... 310/156.53 |
| 2006/0033402 A1 * | 2/2006 | Kim et al. ..................... 310/261 |

FOREIGN PATENT DOCUMENTS

| | | |
|---|---|---|
| JP | 09-093843 A | 4/1997 |
| JP | 09-233750 A | 9/1997 |
| JP | H11-103543 | 4/1999 |
| JP | H11-234931 | 8/1999 |
| JP | 2000-209799 | 7/2000 |
| JP | 2001-037119 | 2/2001 |
| JP | 2001-346347 | 12/2001 |
| JP | 2002-112480 A | 4/2002 |
| JP | 2003-074472 A | 3/2003 |

\* cited by examiner

F I G . 2
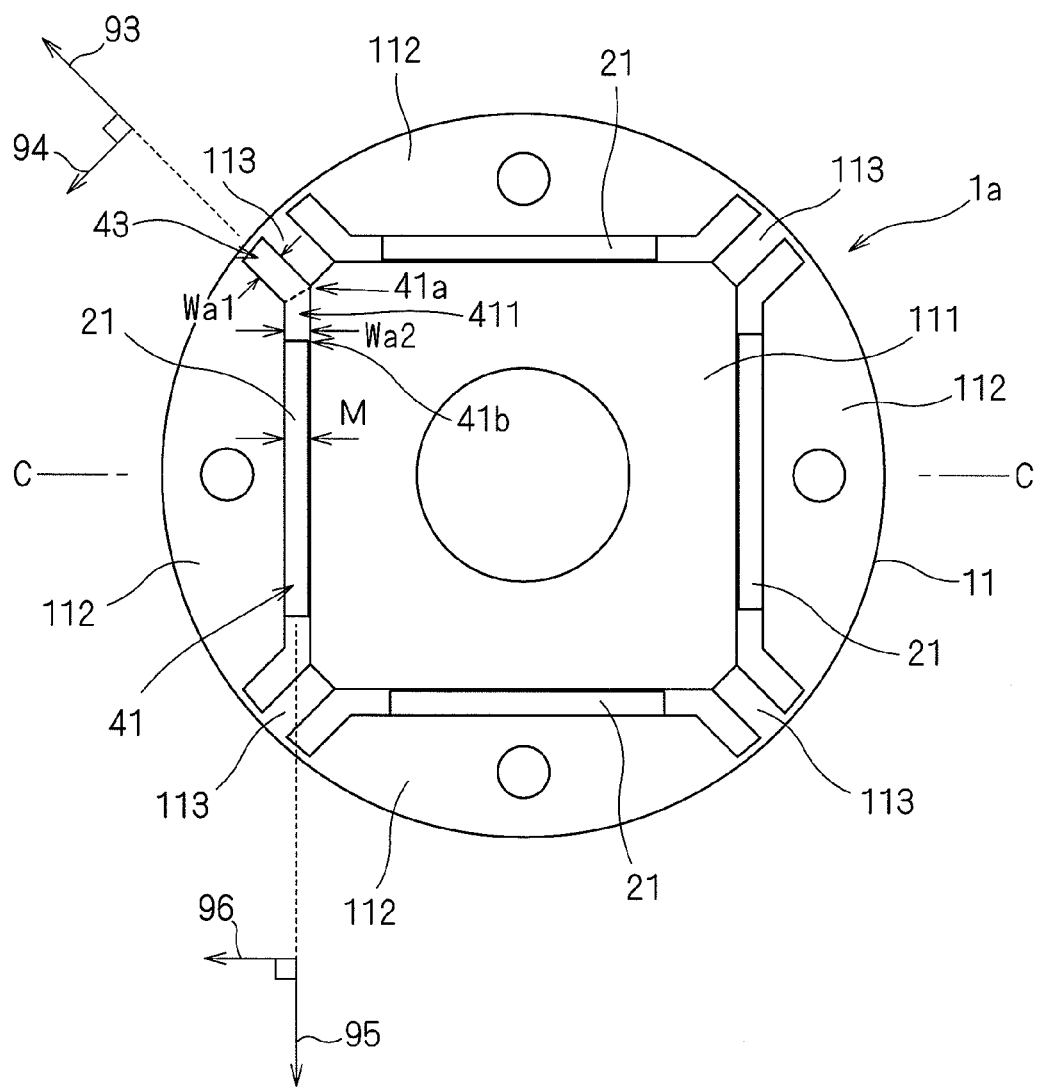

F I G. 5
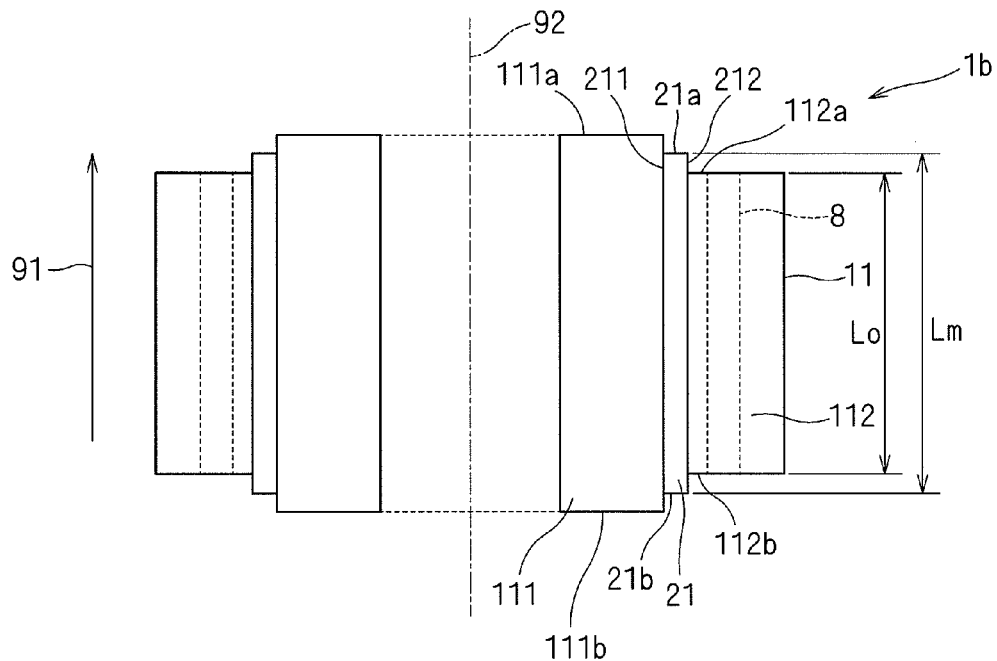
F I G. 6
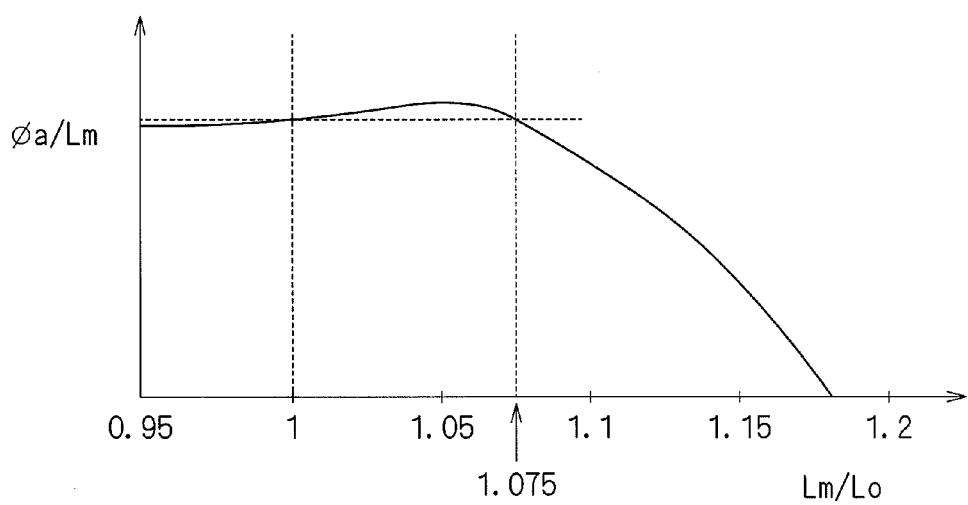

F I G. 9
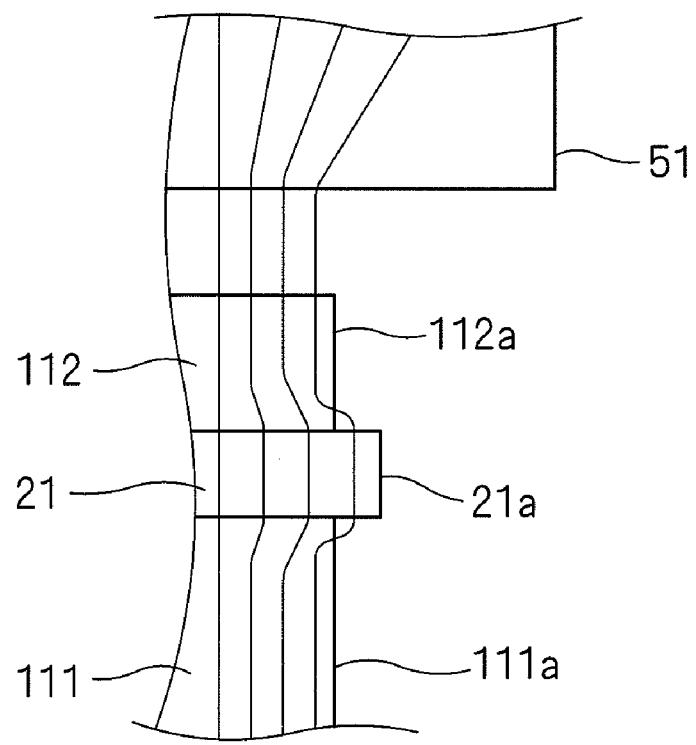

F I G . 1 5
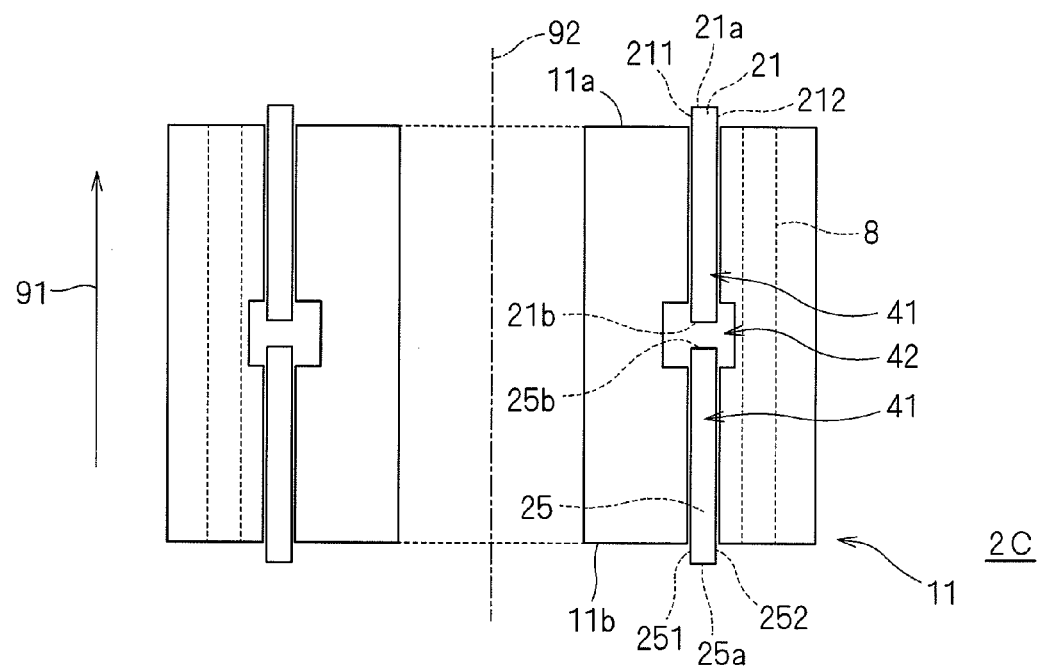

CORE, ROTOR, MOTOR AND COMPRESSOR

CROSS-REFERENCE TO RELATED APPLICATIONS

This U.S. National stage application claims priority under 35 U.S.C. §119(a) to Japanese Patent Application Nos. 2005-032932, filed in Japan on Feb. 9, 2005, and 2005-123740, filed in Japan on Apr. 21, 2005, the entire contents of which are hereby incorporated herein by reference.

TECHNICAL FIELD

The present invention relates to a core, a rotor, a motor and a compressor, and, more specifically, to relative positions of a magnet and a core holding the magnet buried therein.

BACKGROUND ART

Permanent magnet motors are classified for example into a rotating armature type with a permanent magnet arranged on the side of a stator, and a rotating field type with a permanent magnet arranged on the side of a rotor. In a motor of the rotating field type, linkage of magnetic flux generated by a permanent magnet (hereinafter referred to as a "magnet") of a rotor with a coil on the side of a stator is generated to thereby rotate the rotor.

A particular structure of a rotor of the rotating field motor is such that a magnet is buried in a core that extends in a direction of a rotation axis, and a pole face of the magnet extends in the direction of the rotation axis.

Techniques relevant to the present invention are introduced in the following publications.

Japanese Patent Application Laid-Open No. 11-234931 (1999)

Japanese Patent Application Laid-Open No. 2000-209799

Japanese Patent Application Laid-Open No. 2001-37119

In a rotor disclosed in patent publications listed above, an end of a magnet defined in a direction of a rotation axis is depressed or flat with respect to an end of a core defined in the same direction. This causes magnetic flux generated by the magnet to be short-circuited from one pole face to another pole face of the same magnet by passing through the end of the magnet.

FIGS. 31 and 32 show a short circuit of magnetic flux generated in a conventional rotor by magnetic lines of force. In FIG. 31, an end of a magnet is depressed with respect to an end of a core. In FIG. 32, an end of a magnet is flat with respect to an end of a core.

When a short circuit of magnetic flux is generated in a rotor, magnetic flux passing from the rotor to a stator is reduced to cause reduction of drive efficiency or drive output of a motor.

The present invention has been made in view of the above-discussed circumstances. The present invention is intended to prevent a short circuit of magnetic flux in a rotor.

SUMMARY OF THE INVENTION

According to a first aspect of a rotor of the present invention, the rotor comprises: a core (11) extending in a predetermined direction (91); and a magnet (21) buried in the core and having pole faces (211, 212) extending in the predetermined direction. The core has a first part (111; 112) formed by a magnetic material and facing one of the pole faces (211; 212). At least one of ends (21a; 21a) of the magnet defined in the predetermined direction protrudes forward in the predetermined direction with respect to an end (111a; 112a) of the first part, the end of the first part being on the same side with the at least one of the ends of the magnet.

According to a second aspect of a rotor of the present invention, in the first aspect of the rotor, both of the ends (21a; 21b) of the magnet protrude forward with respect to the ends (112a, 112b) of the first part (112), the ends of the first part being on the same sides with corresponding ones of the ends of the magnet. A length (Lm) of the magnet in the predetermined direction (91) satisfies a ratio (Lm/Lo) not more than 1.075 to a length (Lo) of the first part in the predetermined direction.

According to a third aspect of a rotor of the present invention, in the first or second aspect of the rotor, the ends (111a, 111b; 112a, 112b) of the first part (111; 112) have recesses (111c, 111d; 112c, 112d) for exposing the ends (21a, 21b) of the magnet (21).

According to a fourth aspect of a rotor of the present invention, in any one of the first through third aspects of the rotor, the core (11) further has a second part (112; 111) formed by a magnetic material and facing another one of the pole faces (212; 211). At least one of the ends (21a; 21a) of the magnet protrudes forward in the predetermined direction (91) with respect to an end (112a; 111a) of the second part, the end of the second part being on the same side with the at least one of the ends of the magnet.

According to a fifth aspect of a rotor of the present invention, in the fourth aspect of the rotor, the ends (112a, 112b; 111a, 111b) of the second part (112; 111) have recesses (111c 111d; 112c, 112d) for exposing the ends (21a, 21b) of the magnet (21).

According to a sixth aspect of a rotor of the present invention, in any one of the first through fifth aspects of the rotor, the magnet (21) includes a plurality of magnets arranged in a loop. The core (11) further has a third part (113) formed by a magnetic material and arranged between adjacent ones of the magnets (21). At least one of ends (113a; 113b) of the third part defined in the predetermined direction (91) protrudes forward in the predetermined direction with respect to the ends (21a; 21b) of the adjacent ones of the magnets (21), the ends of the adjacent ones of the magnets being on the same side with at least one of ends of the third part.

According to a seventh aspect of a rotor of the present invention, in any one of the first through fifth aspects of the rotor, the magnet (21) includes a plurality of magnets arranged in a loop. The core (11) further has a third part (113) formed by a magnetic material and arranged between adjacent ones of the magnets (21). At least one of ends (113a; 113b) of the third part defined in the predetermined direction (91) is depressed in the predetermined direction with respect to the ends (21a; 21b) of the adjacent ones of the magnets (21), the ends of the adjacent ones of the magnets being on the same side with at least one of the ends of the third part.

According to an eighth aspect of a rotor of the present invention, the rotor comprises any two or more of the rotors (1e, 1f; 1d, 1d; 1g, 1h) as recited in the first through seventh aspects coupled together in the predetermined direction (91). The magnet (21, 25; 21, 21; 21, 25) protrudes forward with respect to the part (111, 112, 121, 122; 111, 112, 111, 112; 111, 112, 121, 122) of the core on the side of at least one of ends of the rotors defined in the predetermined direction, the at least one of the ends having no coupling to another end.

According to a ninth aspect of a rotor of the present invention, the rotor comprises any two or more of the rotors (1e, 1f) as recited in the first through seventh aspects coupled together in the predetermined direction (91). The part (111, 112, 121, 122) of the core has a recess (111d, 112d, 121d, 122d) for exposing the end (21a, 25a) of the magnet (21, 25) on the side of at least one of ends of the rotors coupling to each other, the at least one of the ends being defined in the predetermined direction.

According to a tenth aspect of a rotor of the present invention, in the eighth or ninth aspect of the rotor, the two or more of the rotors (1d, 1d) are coupled through a non-magnetic material (3).

According to an eleventh aspect of a rotor of the present invention, the rotor comprises: a core (11) having a hole (41) and a cavity (42), the core extending in a predetermined direction (91); and at least two magnets (21, 25) having pole faces (211, 212; 251, 252). The hole penetrates the core through the cavity in the predetermined direction from one end (11a) to another end (11b) of the core. The cavity has a cross-sectional area in a plane perpendicular to the predetermined direction that is greater than that of the hole in the plane perpendicular to the predetermined direction. A first one of the magnets (21; 25) is inserted into the hole, the pole faces (211, 212; 251, 252) of the first one of the magnets extending in the predetermined direction. A second one of the magnets (25; 21) is inserted into the hole on the side opposite to the first one of the magnets with respect to the cavity, the pole faces (251, 252; 211, 212) of the second one of the magnets extending in the predetermined direction. An end (21b, 25b) of at least one of the magnets respect to the predetermined direction protrudes into the cavity.

According to a twelfth aspect of a rotor of the present invention, in the eleventh aspect of the rotor, at least one of the magnets (21; 25) has an end (21a, 25a) in the predetermined direction (91) that protrudes forward with respect to the end (11a, 11b) of the core (11).

According to a thirteenth aspect of a rotor of the present invention, in the eighth aspect of the rotor, the two or more of the rotors (1g, 1h) include a first rotor (1g) and a second rotor (1h). A normal direction (21d) to the pole face (212) of the magnet (21) of the first rotor is tilted from a normal direction (25d) to the pole face (252) of the magnet (25) of the second rotor.

According to a fourteenth aspect of a rotor of the present invention, in the thirteenth aspect of the rotor, in a first projection formed by protruding the magnet (21) of the first rotor (1g) onto a predetermined plane perpendicular to the predetermined direction (91) and in a second projection formed by protruding the magnet (25) of the second rotor (1h) onto the predetermined plane perpendicular to the predetermined direction, an outer edge (212e) of the first projection and an inner edge (251e) of the second projection do not intersect with each other, while an inner edge (211e) of the first projection and an outer edge (252e) of the second projection do not intersect with each other.

According to a fifteenth aspect of a rotor of the present invention, in the thirteenth or fourteenth aspect of the rotor, the first rotor (1g) and the second rotor (1h) both have holes (214, 254) into which the magnets (21, 25) are buried. The first rotor and the second rotor are coupled to each other through a magnetic plate (7). The magnetic plate has a through hole (71). The through hole penetrates the magnetic plate in the predetermined direction in an area (222s), the area including projections (214s, 254s) formed by protruding the hole of the first rotor and the hole of the second rotor onto the magnetic to the predetermined direction (91), the area extending from one to the other of the projections.

According to a sixteenth aspect of a rotor of the present invention, in the fifteenth aspect of the rotor, a thickness (t) of the magnetic plate is greater at least than either the thickness of the magnet of the first rotor or the thickness of the magnet of the second rotor.

According to a seventeenth aspect of a rotor of the present invention, in the fifteenth or sixteenth aspect of the rotor, at least either the magnet (21) of the first rotor (1g) or the magnet (25) of the second rotor (1h) protrudes into the through hole (71).

According to an eighteenth aspect of a rotor of the present invention, the rotor has a cavity (45), and first and second holes (43, 44). The rotor comprises: a core (11) extending in a predetermined direction (91); and first and second magnets (21; 25) having pole faces (211, 212; 251, 252). The first hole extends in the predetermined direction from an end (11a) of the core defined in the predetermined direction to communicate with the cavity. The second hole extends in the predetermined direction from another end of the core defined in the predetermined direction to communicate with the cavity. The cross section of the cavity taken in a plane perpendicular to the predetermined direction includes both first and second projections (214s, 254s) formed by protruding the first and second holes onto said plane perpendicular to the predetermined direction. The cross section has an area greater than those of both the first and second holes in the plane perpendicular to the predetermined direction. The first magnet is inserted into the first hole, the pole faces of the first magnet extending in the predetermined direction. The second magnet is inserted into the second hole, the pole faces of the second magnet extending in the predetermined direction.

According to a nineteenth aspect of a rotor of the present invention, in the eighteenth aspect of the rotor, an outer edge (214s2) of the first projection (214s) and an inner edge (254s1) of the second projection (254s) do not intersect with each other, while an inner edge (214s1) of the first projection and an outer edge (254s2) of the second projection do not intersect with each other.

According to a twentieth aspect of a rotor of the present invention, in any one of the first through nineteenth aspects of the rotor, the core (11) has a first gap (41; 41) and a second gap (43; 411) both extending in the predetermined direction (91). The first gap extends in a first direction (95; 95) perpendicular to the predetermined direction, the first gap holding the magnet (21; 21) buried therein. The second gap is defined at an end (41a; 41b) of the first gap in the first direction, the second gap extending in a second direction (93; 95) perpendicular to the predetermined direction. A width of the second gap (Wa1; Wa2) defined in a direction (94; 96) perpendicular to both of the predetermined direction and the second direction is greater than a distance (M; M) between the pole faces (211, 212; 211, 212) of the magnet.

According to a first aspect of a motor of the present invention, the motor comprises: the rotor (1a to 1d, 2a to 2c) as recited in any one of the first through twentieth aspects, the rotor rotating about a rotation axis (92) extending in the predetermined direction (91); and a stator (51) arranged coaxially with the rotor and facing the rotor.

According to a second aspect of a motor of the present invention, in the first aspect of the motor, a height (d) of the magnet (21) from the end (111b) of the core (111) taken along the rotation axis (92) is smaller than a distance (M) between the pole faces (212, 212) of the same magnet (21), the end of the core being on the side opposite to the stator (51) with respect to the magnet.

According to a third aspect of a motor of the present invention, in the first or second aspect of the motor, a distance (M) between the pole faces (211, 212) of the same magnet (21) is greater than a distance (A) between a side surface of the rotor (1a) and a surface of the stator (51) facing the side surface.

A compressor according to the present invention comprises the motor (5) as recited in any one of the first through third aspects.

According to a first aspect of a core of the present invention, the core has first and second parts (111, 112) formed by magnetic materials, the first and second parts both extending in a predetermined direction (91). The first and second parts face each other through a gap (41) extending in the predetermined direction. At least one of ends (111a; 112a) of the first part (111; 112) defined in the predetermined direction protrudes forward in the predetermined direction with respect to an end (112a; 111a) of the second part, the end of the second part being on the same side with the at least one of the ends of the first part.

According to a second aspect of a core of the present invention, in the first aspect of the core, an end of the gap (41) defined in the predetermined direction (91) extends toward the second part (112; 111).

According to a third aspect of a core of the present invention, the core has first and second parts (111, 112) formed by magnetic materials, the first and second parts both extending in a predetermined direction (91). The first and second parts face each other through a gap (41) extending in the predetermined direction. An end of the gap (41) defined in the predetermined direction (91) extends toward the first and second parts.

According to a fourth aspect of a core of the present invention, in any one of the first through third aspects of the core, the core further comprises: two or more of the first parts (112); and a plurality of third parts (113) formed by magnetic materials, the third parts extending in the predetermined direction. The first parts (112) and the plurality of third parts are alternately arranged in a loop around the second part (111). At least one of ends (113a; 113b) of the third part in the predetermined direction protrudes forward in the predetermined direction with respect to the end (112a; 112b) of the second part, the end of the second part being on the same side with the at least one of the ends of the third part.

According to a fifth aspect of a core of the present invention, in any one of the first through third aspects of the core, the core further comprises: two or more of the first parts (112); and a plurality of third parts (113) formed by magnetic materials, the third parts extending in the predetermined direction. The first parts (112) and the plurality of third parts are alternately arranged in a loop around the second part (111). At least one of ends (113a; 113b) of the third part in the predetermined direction is depressed in the predetermined direction with respect to the end (111a; 111b) of the first part, the end of first second part being on the same side with the at least one of the ends of the third part.

According to a sixth aspect of a core of the present invention, the core extends in a predetermined direction (91), and comprises a hole (41) and a cavity (42). The hole penetrates the core through the cavity in the predetermined direction from one end (11a) to another end (11b) of the core. The cavity has a cross-sectional area in a plane perpendicular to the predetermined direction that is greater than that of the hole in the plane perpendicular to the predetermined direction.

According to a seventh aspect of a core of the present invention, the core extends in a predetermined direction (91). The core comprises a cavity (45); a first hole (43) extending in the predetermined direction from one end (11a) of the core to protrude into the cavity; and a second hole (44) extending in the predetermined direction from another end (11b) of the core to protrude into the cavity. The cross section of the cavity taken in a plane perpendicular to the predetermined direction includes both first and second projections (43s, 44s) formed by protruding the first and second holes onto said plane perpendicular to the predetermined direction. The cross section having an area greater than those of both the first and second holes in the plane perpendicular to the predetermined direction.

According to an eighth aspect of a core of the present invention, in the seventh aspect of the core, an outer edge (43s2) of the first projection (43s) and an inner edge (44s1) of the second projection (44s) do not intersect with each other, while an inner edge (43s1) of the first projection and an outer edge (44s2) of the second projection do not intersect with each other.

EFFECT OF THE INVENTION

According to the first aspect of the rotor of the present invention, magnetic resistance at the protruding end of the magnet is increased. Thus magnetic flux is unlikely to be short-circuited from one pole face to another pole face of the same magnet by passing through the end of this magnet.

According to the second aspect of the rotor of the present invention, when a stator is arranged to face the pole face of the magnet when viewed from the first part, the amount of magnetic flux flowing into the stator increases.

According to the third aspect of the rotor of the present invention, a part of the end of the first part is aligned in the predetermined direction with the end of the magnet. Thus the magnet is easily fixed to the core, by which the rotor is made easily.

According to the fourth aspect of the rotor of the present invention, especially when the magnet protrudes forward with respect to both the first and second parts on the side of at least one end of the core, magnetic resistance at the protruding end of the magnet is increased. Thus magnetic flux is unlikely to be short-circuited from one pole face to another pole face of the same magnet by passing through the end of this magnet.

According to the fifth aspect of the rotor of the present invention, a part of the end of the second part is aligned in the predetermined direction with the end of the magnet. Thus the magnet can be easily fixed to the core, by which the rotor is made easily.

According to the sixth aspect of the rotor of the present invention, magnetic saturation in the third part is prevented to thereby prevent the reduction of reluctance torque.

According to the seventh aspect of the rotor of the present invention, magnetic flux is unlikely to be short-circuited at the depression from one pole face to another pole face of the same magnet.

According to the eighth aspect of the rotor of the present invention, magnetic resistance at the protruding end of the magnet is increased. Thus magnetic flux is unlikely to be short-circuited from one pole face to another pole face of the same magnet by passing through the end of this magnet. Further, the rotor is made by independently forming a plurality of rotors. Thus the rotor with large dimensions in the predetermined direction can be made easily. Further, step skew can be defined between a magnet of one rotor and a magnet of another rotor.

According to the ninth aspect of the rotor of the present invention, the rotor is made by independently forming a plurality of rotors. Thus the rotor with large dimensions in the predetermined direction is made easily. Further, step skew can be defined between a magnet of one rotor and a magnet of another rotor. Still further, the core has the recess for exposing the end of the magnet on the side where the rotors are coupled. Thus, magnetic flux is unlikely to be short-circuited from one pole face to another pole face of the same magnet by passing between one magnet and another magnet, even when these magnets are not in contact with each other at the time of coupling between the rotors. This results from large magnetic resistance at the recess.

According to the tenth aspect of the rotor of the present invention, a non-magnetic material is present at the end of the magnet. Thus, magnetic flux is unlikely to be short-circuited from one pole face to another pole face of the same protruding magnet by passing between the magnets, even when the magnets of the rotors are not in contact with each other at the time of coupling between the rotors.

According to the eleventh aspect of the rotor of the present invention, even when the magnets inserted into the holes are not in contact with each other, an end of at least one of the magnets protrudes into the cavity. Thus magnetic flux is unlikely to be short-circuited from one pole face to another pole face of this magnet by passing between the magnets.

According to the twelfth aspect of the present invention, at least one of the magnets has an end that protrudes forward with respect to the end of the core. Thus magnetic resistance at the protruding end is increased, by which magnetic flux is unlikely to be short-circuited from one pole face to another pole face of the same magnet by passing through the end of this magnet.

According to the thirteenth aspect of the present invention, step skew of the magnets of the first and second rotors is defined to thereby reduce torque ripple.

According to the fourteenth aspect of the present invention, no magnetic material is held between the pole face of the magnet of the first rotor and the pole face of the magnet of the second rotor. This prevents a short circuit of magnetic flux from one pole face to another pole face that are opposite in polarity and belong to the different magnets.

According to the fifteenth aspect of the rotor of the present invention, step skew is defined between the magnet of the first rotor and the magnet of the second rotor. Thus the through hole provides a gap equal to or greater than the respective depths of these magnets in the circumferential direction of the magnetic plate. Thus magnetic flux is unlikely to be short-circuited at the through hole in the circumferential direction of the magnetic plate.

According to the sixteenth aspect of the rotor of the present invention, even when a magnetic material is held between the pole face of the magnet of the first rotor close to the magnet of the second rotor and the pole face of the magnet of the second rotor close to the magnet of the first rotor, the magnetic material at this position is spaced apart by the presence of the through hole in the predetermined direction by the thickness of the magnetic plate. Further, the thickness of the magnetic plate is greater than either the thickness of the magnet of the first rotor or that of the magnet of the second rotor. As a result, a short circuit of magnetic flux does not occur between these pole faces by using the through hole as a flux path.

According to the seventeenth aspect of the rotor of the present invention, even when the magnet of the first rotor and the magnet of the second rotor are not in contact with each other, magnetic flux is unlikely to be short-circuited from one pole face to another pole face of the same protruding magnet by passing through the end of this magnet.

According to the eighteenth aspect of the rotor of the present invention, step skew can be defined between the first and second magnets. Further, as a result of the presence of the cavity, magnetic flux is unlikely to be short-circuited from one pole face to another pole face of the same magnet by passing through the end of this magnet, even when the first and second magnets are not in contact with each other.

According to the nineteenth aspect of the rotor of the present invention, no magnetic material is held between the pole face of the first magnet and that of the second magnet. This prevents a short circuit of magnetic flux from one pole face to another pole face that are opposite in polarity and belong to the different magnets.

According to the twentieth aspect of the rotor of the present invention, magnetic flux is unlikely to be short-circuited from one pole face to another pole face of the same magnet by passing through the second gap at the end of the magnet close to the second gap.

According to the first aspect of the motor of the present invention, the drive efficiency and drive output of the motor are improved.

According to the second aspect of the motor of the present invention, magnetic flux is unlikely to be short-circuited from the pole face on the side opposite to the stator to the pole face on the side of the stator by passing through the end of the magnet.

According to the third aspect of the motor of the present invention, magnetic flux is unlikely to be short-circuited from the pole face on the side of the stator to the pole face on the side opposite to the stator by passing through the end of the magnet. Namely, magnetic flux flows into the stator in large quantities The compressor of the present invention realizes effective compression for example of a refrigerant.

According to the first aspect of the core of the present invention, in a rotor formed by inserting a magnet into the gap, an end of the magnet defined in the predetermined direction is located between the ends of the first and second parts in the predetermined direction. Thus magnetic flux is unlikely to be short-circuited from one pole face to another pole face of the same magnet by passing through the end of this magnet.

According to the second aspect of the core of the present invention, in a rotor formed by inserting a magnet into the gap, a recess for exposing an end of this magnet is formed at the end of the second part. Thus a part of the end of the second part is aligned in the predetermined direction with the end of the magnet. As a result, the magnet is easily fixed to the core.

According to the third aspect of the core of the present invention, in a rotor formed by inserting a magnet into the gap, recesses for exposing an end of this magnet are formed at the ends of the first and second parts. Thus respective parts of the ends of the first and second parts is aligned in the predetermined direction with the end of the magnet. As a result, the magnet is easily fixed to the core.

According to the fourth aspect of the core of the present invention, in a rotor formed by inserting a magnet into the gap, the reduction of reluctance torque is prevented when the end of the third part in the predetermined direction protrudes forward in the predetermined direction with respect to an end of the magnet.

According to the fifth aspect of the core of the present invention, in a rotor formed by inserting a magnet into the gap, when the end of the third part in the prescribed direction is depressed with respect to an end of the magnet, magnetic flux is unlikely to be short-circuited at the depression from one pole face to another pole face of the same magnet.

According to the sixth aspect of the core of the present invention, in a rotor formed by inserting magnets into the hole from both ends of the core, at least one of the magnets protrudes into the cavity. Thus, even when these magnets are not in contact with each other, magnetic flux is unlikely to be short-circuited from one pole face to another pole face of this at least one magnet by passing between the two magnets.

According to the seventh aspect of the core of the present invention, when magnets are inserted into the first and second holes, step skew can be defined between these magnets. Further, as a result of the presence of the cavity, magnetic flux is unlikely to be short-circuited from one pole face to another pole face of the same magnet by passing through the end of this magnet, even when the magnets are not in contact with each other.

According to the eighth aspect of the core of the present invention, when first and second magnets are respectively inserted into the first and second holes, no magnetic material is held between the pole face of the first magnet and the pole face of the second magnet. This prevents a short circuit of magnetic flux from one pole face to another pole face that are opposite in polarity and belong to the different magnets.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a top view of the rotor 1a viewed in a predetermined direction 91;

FIG. 5 conceptually shows a cross section of a rotor 1b discussed in the first embodiment;

FIG. 6 shows variations in a magnetic flux quantum $\phi$a/Lm relative to a ratio Lm/Lo;

FIG. 9 shows magnetic flux flowing in the rotor 1d by magnetic lines of force;

FIG. 15 conceptually shows a cross section of a rotor 2c discussed in a fourth embodiment;

DETAILED DESCRIPTION OF THE INVENTION

First Embodiment

Figure 1:
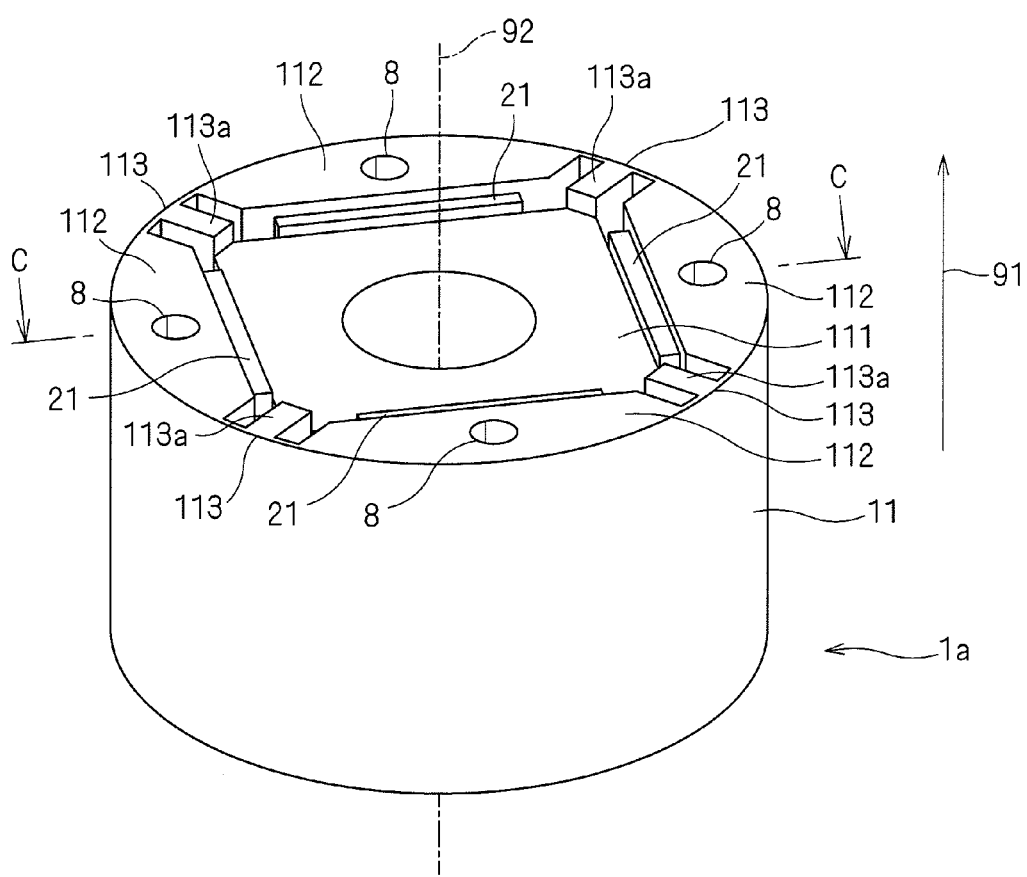
FIG. 1 is a perspective view conceptually showing a rotor 1a discussed in a first embodiment.
Figure 3:
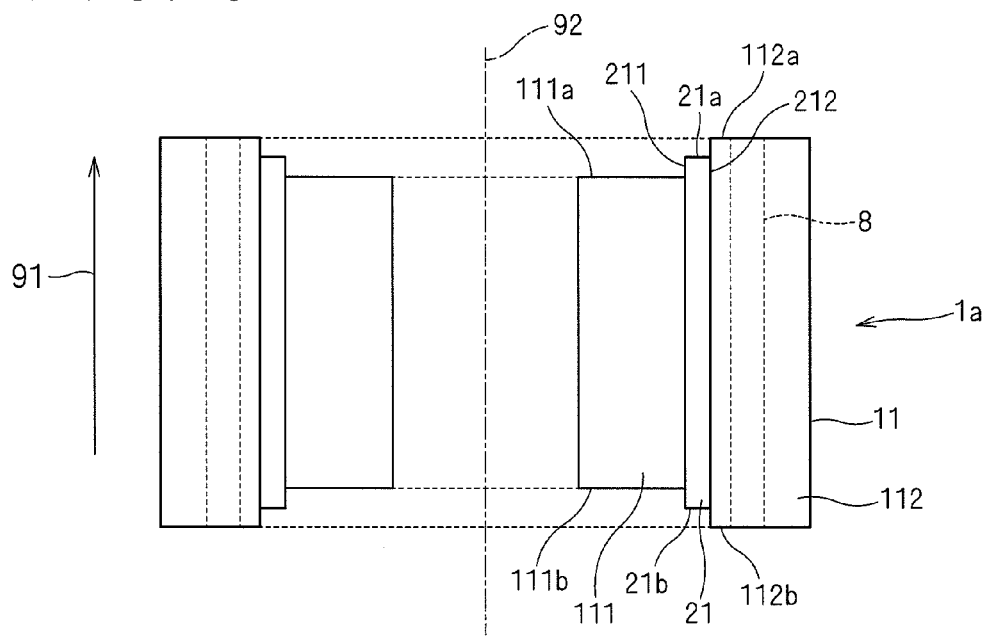
FIG. 3 shows a cross section of the rotor 1a taken along a cutting plane C-C.

FIG. 1 is a perspective view conceptually showing a rotor 1a according to a first embodiment. FIG. 2 is a top view of the rotor 1a viewed in a predetermined direction 91. FIG. 3 shows a cross section of the rotor 1a at a position C-C.

The rotor 1a comprises a core 11 extending in the predetermined direction 91, and a plurality of magnets 21.

The core has parts 111 to 113 formed by magnetic materials and extending in the predetermined direction 91, wherein the parts 112 and 113 are respectively provided more one. As an example of the formation of the core 11, magnetic steel sheets are stacked and bolts are put through all holes 8 shown in FIG. 1. Then at least one side of each bolt is fastened by a nut or a rivet pin. In FIG. 3, the holes 8 are indicated by dashed lines.

The parts 112 and 113 are alternately arranged in a loop around the part 111. The parts 112 face the part 111 through gaps 41.

The magnets 21 are buried in the gaps 41, and arranged in the form of a loop in the core 11. The magnets 21 each have pole faces 211 and 212 extending in the predetermined direction 91. The magnets 21 each have exposed ends 21a and 21b defined in the predetermined direction 91.

The parts 111 to 113 are described as follows in terms of the relations with the magnets 21. That is, the part 111 is arranged to face the pole faces 211, and the parts 112 are arranged to face the pole faces 212. The parts 113 are arranged between adjacent ones of the magnets 21.

The rotor 1a is applied for example to a motor with a stator, and rotates about a rotation axis 92 extending in the predetermined direction 91. A stator (not shown) is arranged coaxially with the rotor 1a and faces the rotor 1a. More specifically, the stator is arranged to face the outer peripheral surface of the rotor 1a.

In this case, the part 111 is arranged to face the pole faces 211 on the side opposite to the stator with respect to the magnets 21. The parts 112 and 113 are alternately arranged in the form of a loop on the same side with the stator with respect to the magnets 21.

In each of the magnets 21, at least either the end 21a or 21b of the magnet 21 protrudes forward in the predetermined direction 91 with respect to an end 111a or an end 111b of the part 111 that are respectively on the same sides with the ends 21a and 21b. In FIG. 3, both the ends 21 a and 21 b of the magnet 21 are particularly shown to protrude forward parallel to the predetermined direction 91 with respect to the part 111.

According to this aspect, magnetic resistance at the protruding ends 21a and 21b of the magnet 21 is increased. Thus magnetic flux is unlikely to be short-circuited from either the pole faces 211 or 212 to either the pole face 212 or 211 of the same magnet 21 by passing through the ends 21 a and 21b of this magnet 21.

Figure 4:
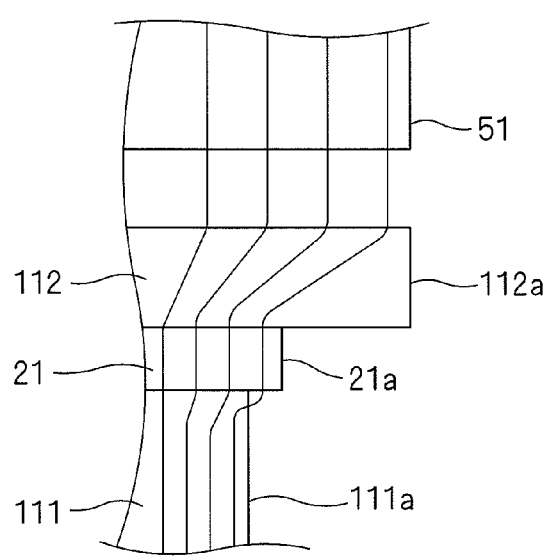
FIG. 4 shows magnetic flux flowing in the rotor 1a by magnetic lines of force.

FIG. 4 shows magnetic flux flowing in the rotor 1a discussed above by magnetic lines of force. The magnetic flux generated in the magnet 21 flows from the part 111, passing through the magnet 21 and the part 112, and then flows into a stator 51 without causing a short circuit even in the end 21a of the magnet 21.

In each of the magnets 21, at least either the end 21a or 21b of the magnet 21 may protrude forward in the predetermined direction 91 with respect to an end 112a or an end 112b of the part 112 that are respectively on the same sides with the ends 21a and 21b. In a rotor 1b shown in FIG. 5, both the ends 21a and 21b of the magnet 21 are particularly shown to protrude forward parallel to the predetermined direction 91 with respect to the part 112. This aspect produces the same effect as that discussed above.

FIG. 6 shows variations in a magnetic flux quantum relative to a ratio Lm/Lo where Lm is a length of the magnet 21 in the predetermined direction 91 and Lo is the length of the part 112 in the predetermined direction 91. For a magnetic flux quantum, a quantum φ a/Lm is applied that indicates a quantum of magnetic flux φ a flowing into a stator per unit length of the magnet 21.

The ratios Lm/Lo lower than 1, equal to 1 and higher than 1 respectively indicate the cases where both the ends 21a and 21b of the magnet 21 are depressed, flat and protrude forward with respect to the ends 112a and 112b of the part 112 that are respectively on the same sides with the ends 21a and 21b.

The quantum φ a/Lm increases with the increase of the ratio Lm/Lo from 0.95. The reason therefor is considered that a short circuit of magnetic flux is prevented in the ends 21a and 21b of the magnet 21. The quantum φ a/Lm decreases with the increase of the ratio Lm/Lo from around 1.05. The reason therefor is considered that a considerable degree of protrusion of the magnet 21 results in a short circuit of magnetic flux.

Considering the quantum φ a/Lm that is obtained when the ratio Lm/Lo is 1 as a reference value, the quantum φ a/Lm is the same as or higher than this reference value when the ratio Lm/Lo is not smaller than 1 and not higher than 1.075. That is, the amount of magnetic flux flowing into a stator increases.

The above discussions with reference to FIG. 6 are given in a situation where the magnet 21 has a thickness of 1.5 mm to 4 mm. These discussions are also applicable when the thickness of the magnet 21 goes out of this range.

Figure 7:
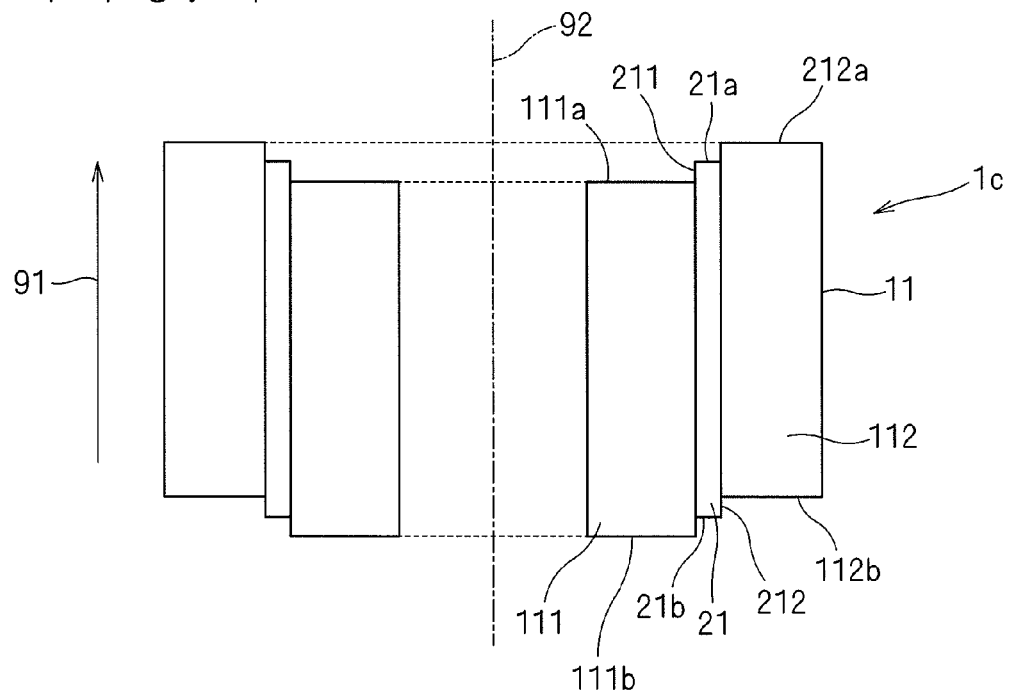
FIG. 7 conceptually shows a cross section of a rotor 1c discussed in the first embodiment.

As an example, a rotor 1c shown in FIG. 7 produces the same effect as that discussed above. Namely, in the stator 1c, the end 21a of the magnet 21 protrudes forward in the predetermined direction 91 with respect to the end 111a of the part 111 that is on the same side with the end 21a. The end 21b of the magnet 21 protrudes forward in the predetermined direction 91 with respect to the end 112b of the part 112 that is on the same side with the end 21b.

As an example, a rotor 1c shown in FIG. 7 produces the same effect as that discussed above. Namely, in the rotor 1c, the end 21a of the magnet 21 protrudes forward in the predetermined direction 91 with respect to the end 111a of the part 111 that is on the same side with the end 21a. The end 21b of the magnet 21 protrudes forward in the predetermined direction 91 with respect to the end 112b of the part 112 that is on the same side with the end 21b.

Second Embodiment

Figure 8:
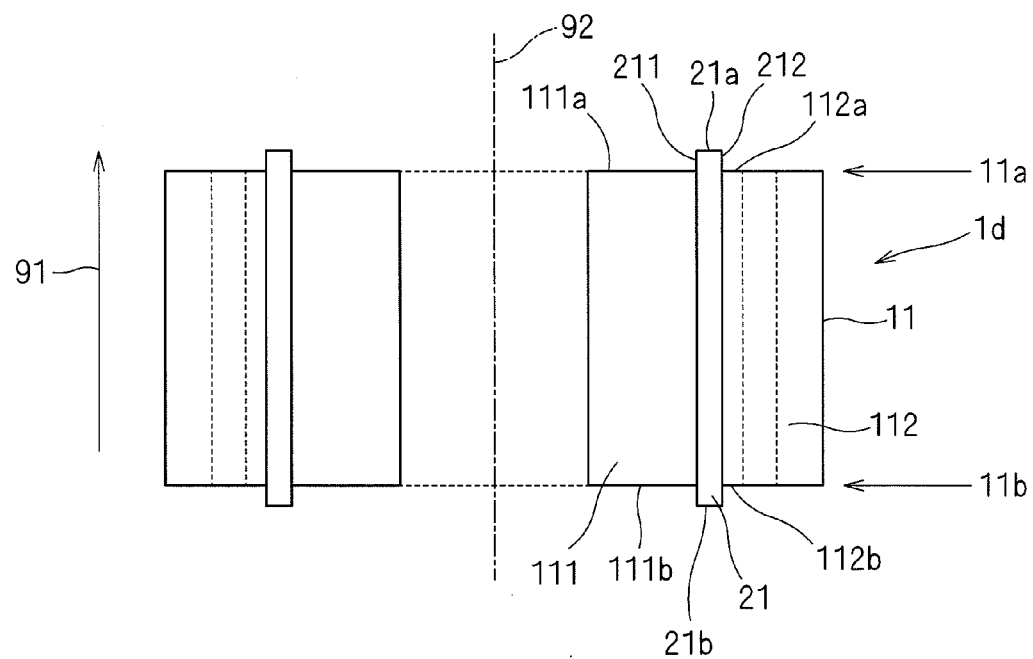
FIG. 8 conceptually shows a cross section of a rotor 1d discussed in a second embodiment.

FIG. 8 conceptually shows a cross section of a rotor 1d according to a second embodiment. In the rotor 1d, at least either the end 21a or 21b of the magnet 21 protrudes forward parallel to the predetermined direction 91 with respect to both the end 111a and of the part 111 and the end 112a of the part 112 that are on the same side with the end 21a, or with respect to both the end 111b of the part 111 and the end 112b of the part 112 that ate on the same side with the end 21b. In FIG. 8, both the ends 21a and 21b of the magnet 21 are particularly shown to protrude forward with respect to the parts 111 and 112.

According to this aspect, magnetic resistance at the protruding end 21a or 21b of the magnet 21 is increased to a greater degree. Thus magnetic flux is unlikely to be short-circuited from either the pole face 211 or 212 to either the pole face 212 or 211 of the same magnet 21 by passing through the ends 21a and 21b of this magnet 21.

FIG. 9 shows magnetic flux flowing in the rotor 1d by magnetic lines of force. The magnetic flux generated in the magnet 21 flows from the part 111, passing through the magnet 21 and the part 112, and then flows into the stator 51 without causing a short circuit even in the end 21a of the magnet 21.

In each of the embodiments described above, at least one of the ends 113a and 113b of the part 113 (although not shown in FIG. 1, the end 113b is on the side opposite to the 113a of the part 113) in the predetermined direction 91 desirably protrudes forward parallel to the predetermined direction 91 with respect to the ends 21a or 21b of the magnets 21 adjacent to each other with this part 113 held therebetween, where these ends 21a and 21b are respectively on the same sides with the ends 113a and 113b. This aspect is shown for example in FIG. 1.

According to this aspect, magnetic saturation in the part 113 is prevented to thereby prevent the reduction of reluctance torque. A21

At least either the end 113a or 113b of the part 113 is also desirably depressed in the predetermined direction 91 with respect to the ends 21a or 21b of the magnets 21 adjacent to each other with this part 113 held therebetween, where these ends 21a and 21b are respectively on the same sides with the ends 113a and 113b. The reason therefor is that magnetic flux is unlikely to be short-circuited from either the pole faces 211 or 212 to either the pole face 212 or 211 of the same magnet 21.

This example is desirable especially in a situation where the part 113 has a gap 43 communicating to the gap 41, and the width of this gap 43 is smaller than a distance between the pole faces 211 and 212 of the same magnet 21 as shown in FIG. 2. This is because, although a short circuit is likely to occur in this case from either the pole faces 211 or 212 to either the pole face 212 or 211 of the same magnet 21 through this gap, a short circuit of magnetic flux is less likely at the depression of the part 113 formed by defining the part 113 at a lower level than the magnet 21.

In both of the aspects described above in which the end 113a or 113b of the part 113 protrudes forward or is depressed with respect to the end 21a or 21b (FIG. 3) of the magnet 21, a distance Wal between the parts 112 and 113 that is interpreted as the width of the gap 43 is desirably greater than a distance M between the pole faces 211 and 212 of the magnet 21 (FIG. 2).

This is because magnetic flux is unlikely to be short-circuited at an end 41b of the magnet 21 close to the part 113 from either the pole faces 211 or 212 to either the pole face 212 or 211 of the same magnet 21 by passing through the gap 43.

Considering the gaps 41 and 43 as first and second gaps, the foregoing discussions are interpreted as follows. The first gap 41 extends in a direction 95 perpendicular to the predetermined direction 91, and holds the magnet 21 buried therein. The second gap 43 is defined at an end 41a of the first gap 41 in the direction 95, and extends in a direction 93 perpendicular to the predetermined direction 91. The width Wa1 of the second gap 43 in a direction 94 perpendicular to both of the predetermined direction 91 and the direction 93 is greater than the distance M between the pole faces 211 and 212 of the magnet 21.

When the end 41b of the magnet 21 buried in the gap 41 does not reach the end 41a of the first gap, a distance Wa2 between the parts 111 and 112 considered as the width of a gap 411 as part of the gap 41 defined between the end 41a and the end 42b is desirably greater than the distance M between the pole faces 211 and 212 of the magnet 21 (FIG. 2).

This is because magnetic flux is unlikely to be short-circuited from either the pole face 211 or 212 to either the pole face 212 or 211 of the same magnet 21 at the end 41b of the magnet 21 by passing through the gap 411.

Considering part of the gap 41 into which a magnet is buried as a first gap, the gap 411 as a second gap, the end 41b of the magnet 21 as an end of the first gap, the foregoing discussions are interpreted as follows. The first gap extends in the direction 95 perpendicular to the predetermined direction 91, and holds the magnet 21 buried therein. The second gap 411 is defined at the end 41b of the first gap 41, and extends in the direction 95. The width Wa2 of the second gap 411 in the direction 96 perpendicular to both of the predetermined direction 91 and the direction 95 is greater than the distance M between the pole faces 211 and 212 of the magnet 21.

These aspects are also applicable to the case where the ends 113a and 113b of the part 113 are flat in the predetermined direction 91 with respect to the ends 21a and 21b of the magnet 21 that are respectively on the same sides with the ends 113a and 113b.

In each of the rotors 1a through 1d discussed in the present embodiment, when the magnet 21 protrudes forward with respect to the part 111, the end 111a and 111b of the part 111 desirably has a recess for exposing the ends 21a and 21b of the magnet. This is also applicable to the case where the magnet 21 protrudes forward with respect to the part 112. The aspects discussed below with reference to FIGS. 10 and 11 are especially desirable.

Figure 10:
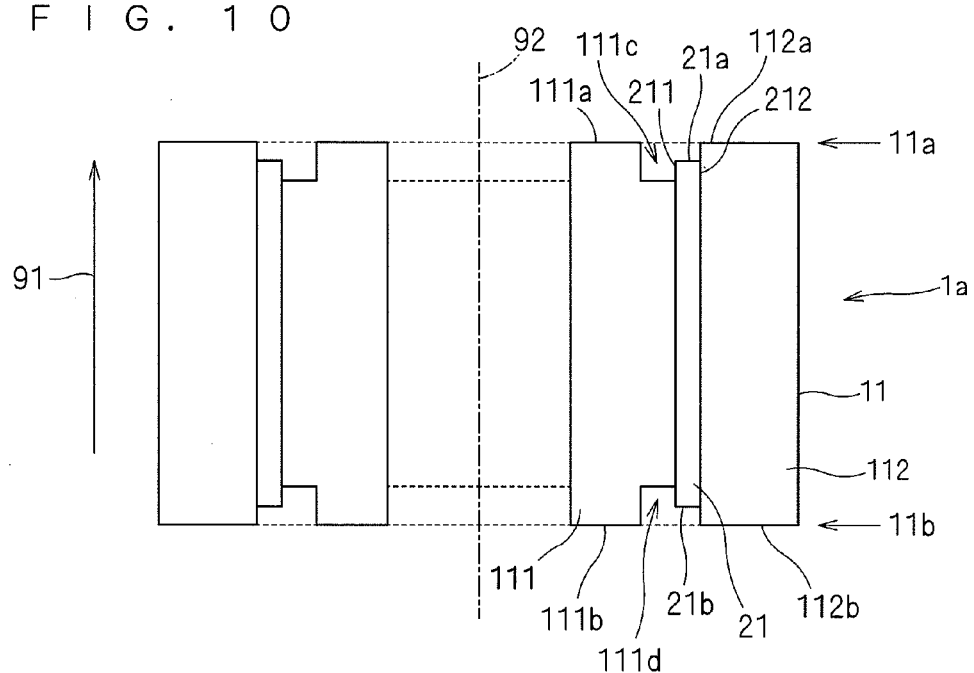
FIGS. 10 and 11 conceptually shows a cross section of a rotor in which an end of a core has a recess.

With reference to FIG. 10 in which the rotor 1a is shown, the ends 111a and 111b of the part 111 are respectively flat in the predetermined direction 91 with respect to the ends 112a and 112b of the part 112. The ends 111a and 111b respectively have recesses 111c and 111d for exposing the ends 21a and 21b of the magnet 21.

Figure 11:
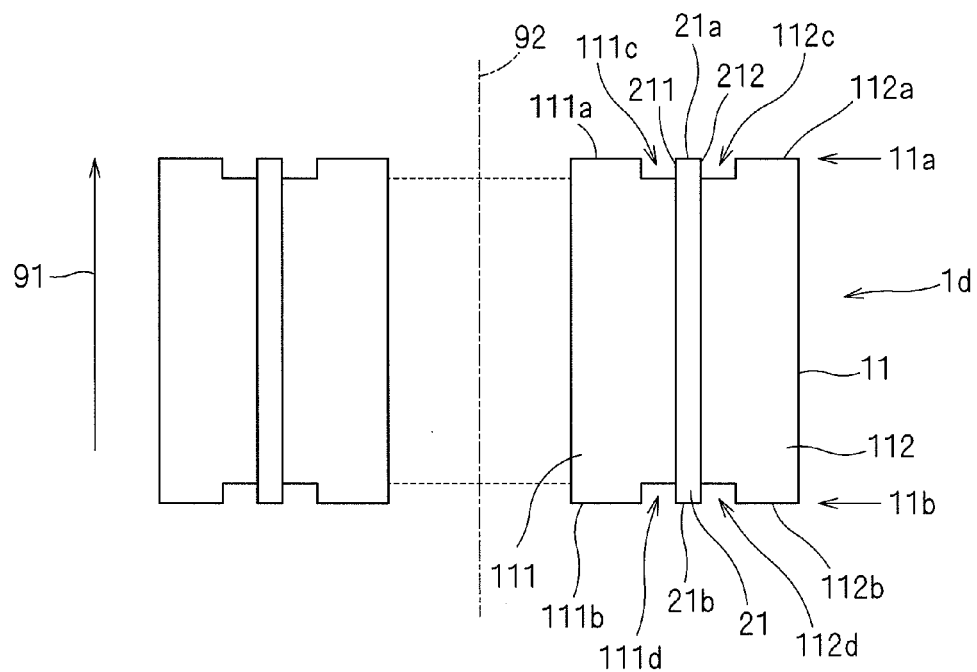

With reference to FIG. 11, the ends 111a and 111b of the part 111 are respectively flat in the predetermined direction 91 with respect to the ends 112a and 112b of the part 112. These ends 111a, 111b, 112a and 112b respectively have recesses 111c, 111d, 112c and 112d for exposing the ends 21a and 21b of the magnet 21.

According to these aspects, pressure can be uniformly applied parallel to the predetermined direction 91 from both ends of the core 11 to the core 11. Thus the rotor is made easily.

At least one of the ends 111a, 111b, 112a and 112b is desirably flat in the predetermined direction 91 with respect to the end 21a or 21b of the magnet 21, especially for the reason that the core 11 and the magnet 21 are easily fixed. In the aspect shown in FIG. 11, the ends 111a and 112a are flat in the predetermined direction 91 with respect to the end 21a, whereas the ends 111b and 112b are flat in the predetermined direction 91 with respect to the end 21b.

In each of the embodiments described above, the magnet 21 may include two or a plurality of divided magnets. Further, magnets adjacent to each other in the predetermined direction 91 are not necessarily in contact with each other. These magnets are however desirably in contact, since magnetic flux is not short-circuited from one pole face to another pole face of the same magnet by passing between the two adjacent magnets.

Figure 12:
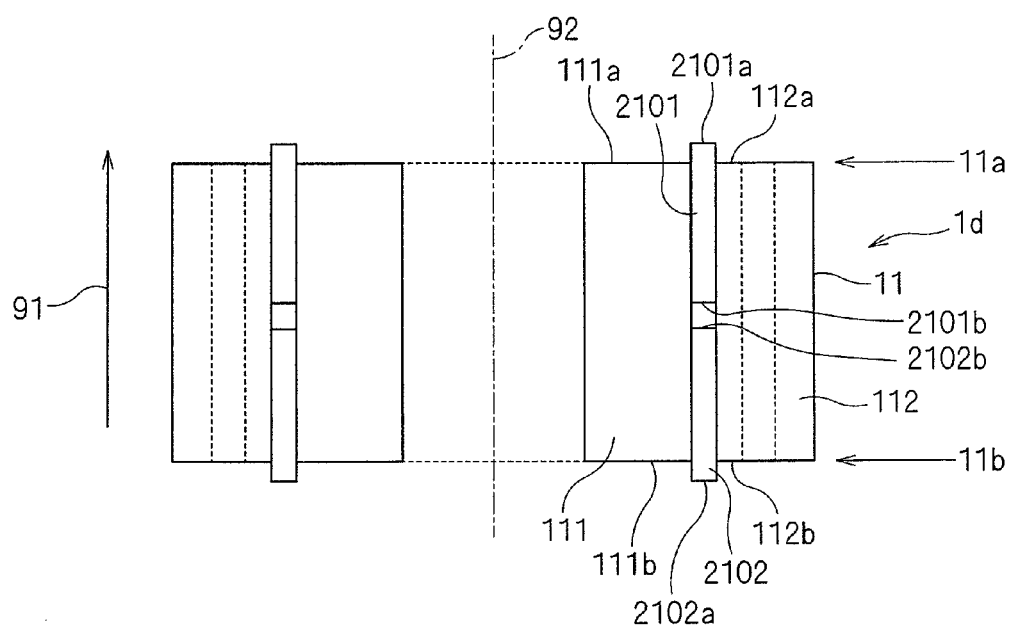
FIG. 12 conceptually shows a cross section of a rotor provided with several magnets.

In the aspect shown in FIG. 12, the magnet 21 of the rotor shown in FIG. 8 is replaced by two divided magnets 2101 and 2102. The same reference numerals are applied to the constituent parts of FIG. 12 that correspond to those parts shown in FIG. 8. The magnet 2101 has one end 2101a in the predetermined direction 91 that protrudes forward in the predetermined direction 91 with respect to both the ends 111a and 112a of the parts 111 and 112.

The magnet 2102 has one end 2102a in the predetermined direction 91 that protrudes forward in a direction opposite to the predetermined direction 91 with respect to both the ends 111b and 112b of the parts 111 and 112.

Other ends 2101b and 2102b of the magnets 2101 and 2102 respectively are not required to be in contact with each other as shown for example in FIG. 12.

Means for fixing the magnets 2101 and 2102 to predetermined positions in the predetermined direction 91 are desirably provided inside the gap 41 (FIG. 2). Such means may include for example press fitting of the magnets 2101 and 2102 into the gap 41, fixation of the magnets 2101 and 2102 by providing protrusions in part of the gap 41 for receiving the other ends 2101b and 2102b of the magnets 2101 and 2102, and fixation of the magnets 2101 and 2102 by an adhesive agent.

Third Embodiment

Figure 13:
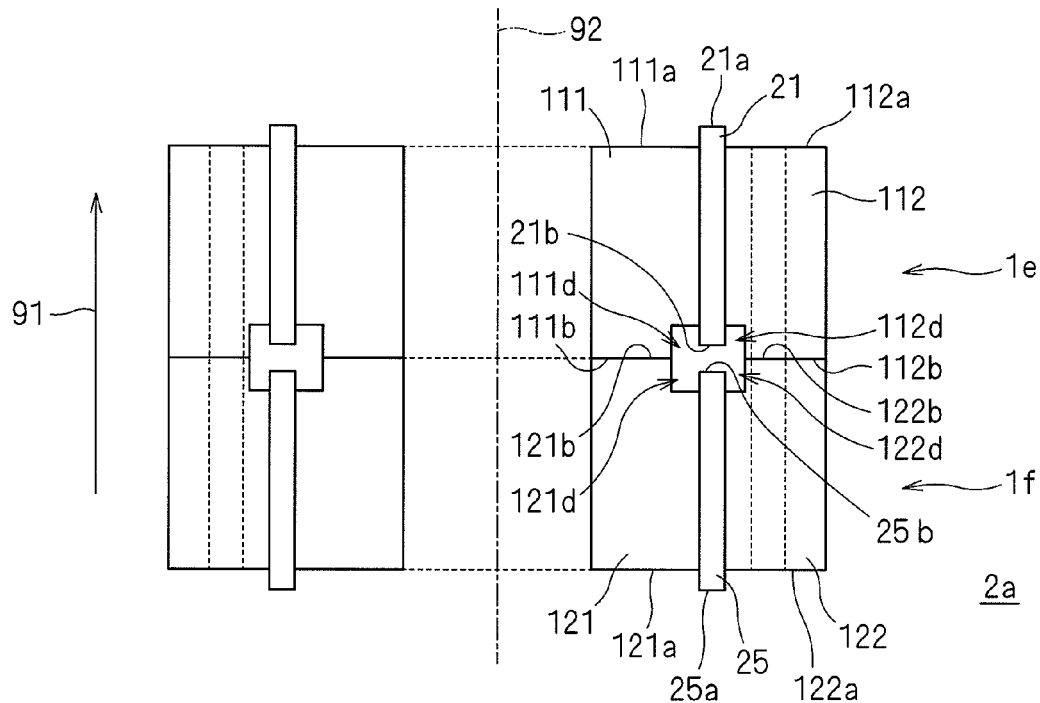
FIG. 13 conceptually shows a cross section of a rotor 2a discussed in a third embodiment.

FIG. 13 conceptually shows a rotor 2a according to a third embodiment. The rotor 2a is formed by coupling rotors 1e and 1f in the predetermined direction 91.

With reference to the rotor 1d discussed in the second embodiment, in the rotor 1e, the ends 111b and 112b of the parts 111 and 112 have the recesses 111d and 112d for exposing the end 21b of the magnet 21. The ends 111b and 112b are flat in the predetermined direction 91 with respect to each other.

The rotor 1f has a core with parts 121 and 122, and a magnet 25, and has the same structure as that of the rotor 1e. Namely, the parts 121 and 122 respectively correspond to the parts 111 and 112 of the rotor 1e, and the magnet 25 corresponds to the magnet 21 of the rotor 1e. The magnet 25 protrudes forward in the predetermined direction 91 with respect to the parts 121 and 122. Ends 121b and 122b of the parts 121 and 122 have recesses 121d and 122d for exposing an end 25b of the magnet 25. The ends 121b and 122b are flat in the predetermined direction 91 with respect to each other.

The ends 111b and 112b of the parts 111 and 112 of the rotor 1e are respectively coupled to the ends 121b and 122b of the parts 121 and 122 of the rotor 1f, thereby defining a cavity 42 by the recesses 111d, 112d, 121d and 122d.

As to the rotor 2a, it can be made by independently forming the plurality of rotors 1e and 1f. Thus the rotor 2a with large dimensions in the predetermined direction 91 can be made easily. Further, a skew can be defined between the magnets 21 and 25.

Moreover, the core has the recesses 111d, 112d, 121d and 122d for exposing the ends 21b and 25b of the magnets 21 and 25 on the side where the rotors 1e and 1f are coupled. Thus, magnetic flux is unlikely to be short-circuited from one pole face to another pole face of the same magnets 21 and 25 by passing between the magnets 21 and 25, even when the magnets 21 and 25 are not in contact to each other with coupling between the rotors 1e and 1f. This results from large magnetic resistance at the cavity 42.

The rotor 2a is not necessarily required to have all of the recesses 111d, 112d, 121d and 122d.

Further, both the rotors 1e and 1f may have none of the recesses 111d, 112d, 121d and 122d. In this case, while the cavity 42 is not defined in the rotor 2a, the rotor 2a is made by independently forming the plurality of rotors 1e and 1f. Still further, as a result of increased magnetic resistance at the protruding ends 21a and 25a of the magnets 21 and 25, magnetic flux is unlikely to be short-circuited from one pole face to another pole face of the same magnets 21 and 25 by passing through the ends 21a and 25a of the magnets 21 and 25.

Figure 14:
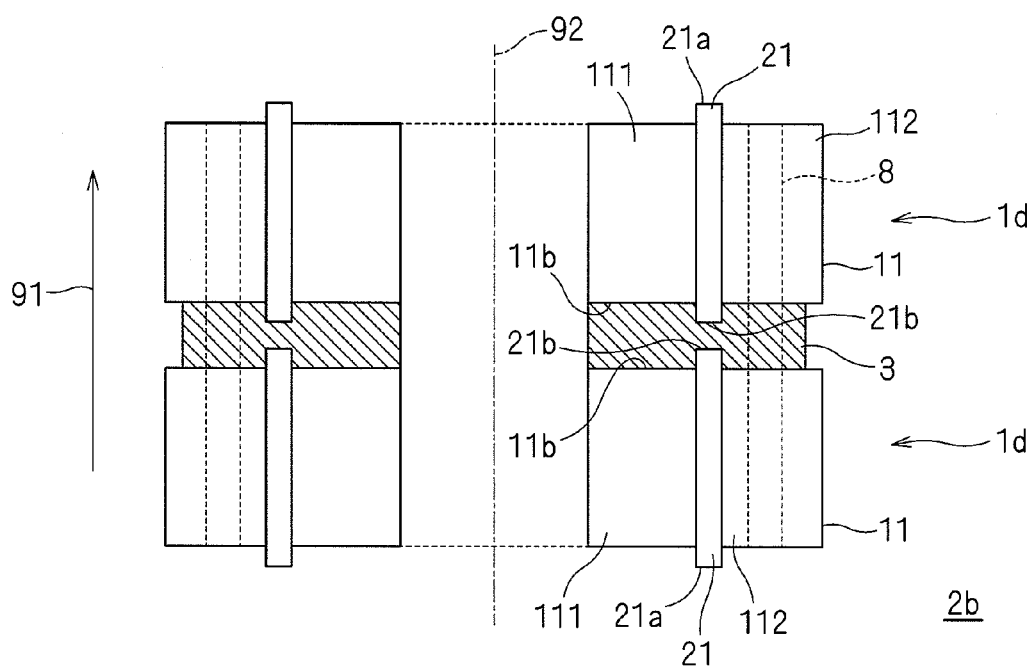
FIG. 14 conceptually shows a cross section of a rotor 2b discussed in the third embodiment.

As shown for example in FIG. 14, a plurality of rotors may be coupled through a non-magnetic material. A rotor 2b shown in FIG. 14 especially includes two rotors 1d discussed in the second embodiment.

These two rotors 1d are coupled to each other by connecting both ends 11b of the rotors 1d in the predetermined direction 91 through a non-magnetic material 3. At this time, a non-magnetic material is also present between the two magnets 21.

In the rotor 2b, a non-magnetic material is present at the ends 21b of the magnets 21 which results in large magnetic resistance. Thus, magnetic flux is unlikely to be short-circuited from one pole face to another pole face of the same magnets 21 by passing between the magnets 21, even when the magnets 21 of the rotors 1d are not in contact with each other at the time of coupling between the two rotors 1d.

Two or more of the above-discussed rotors 1a through 1d may also be coupled through a non-magnetic material, in which case the same effect as that discussed above is produced.

For the same reason as discussed in the second embodiment, in the present embodiment, both ends of each of the rotors 2a and 2b in the predetermined direction 91 also desirably have recesses for exposing the ends 21a and 25a of the magnets 21 and 25.

Fourth Embodiment

The rotor 2a with the cavity 42 discussed in the third embodiment is not necessarily formed for example by the coupling between the rotors 1e and 1f. Such an alternative is shown as a rotor 2c in FIG. 15.

The rotor 2c has a core 11, and magnets 21 and 25. The core 11 extends in a predetermined direction 91, and has a hole 41 and a cavity 42. The magnet 21 has pole faces 211 and 212, and the magnet 25 has poles faces 251 and 252.

The hole 41 penetrates the core 11 through the cavity 42 in the predetermined direction 91 from one of the ends 11a and 11b of the core 11 to the other thereof.

The cavity 42 has a cross-sectional area in a plane perpendicular to the predetermined direction 91 that is greater than that of the hole 41 in the plane perpendicular to the predetermined direction 91.

The magnets 21 and 25 are inserted into the hole 41. At this time, the pole faces 211 and 212 of the magnet 21 extend in the predetermined direction 91, and an end 21b of the magnet 21 protrudes into the cavity 42. The pole faces 251 and 252 of the magnet 25 extend in the predetermined direction 91, and an end 25b of the magnet 25 protrudes into the cavity 42.

The magnets 21 and 25 are inserted into the hole 41 for example from the ends 11a and 11b of the core 11, respectively.

In this rotor 2c, the ends 21b and 25b of the magnets 21 and 25 protrude into the cavity 42. Thus, magnetic flux is unlikely to be short-circuited from either the pole faces 211 or 212 to either the pole face 212 or 211 of the same magnets 21, and from either the pole face 251 or 252 to either the pole face 252 or 251 of the same magnet 25 by passing between the magnets 21 and 25, even when the two magnets 21 and 25 inserted into the hole 41 are not in contact with each other.

While both the magnets 21 and 25 protrude into the cavity 42 in the rotor 2c, only one of the magnets 21 and 25 may protrude into the cavity 42, for example. By way of example, magnetic flux is unlikely to be short-circuited at the end 21b of the magnet 21 when the magnet 21 protrudes into the cavity 42. This is also applicable to the case where the magnet 25 protrudes into the cavity 42.

At least either the magnet 21 or 25 may protruded forward with respect to the end 11a or 11b of the core 11. As an example, magnetic resistance is increased at the end 21a of the magnet 21 when the magnet 21 protrudes forward. Thus magnetic flux is unlikely to be short-circuited from either pole faces 211 or 212 to either the pole face 212 or 211 of the magnet 21 by passing through the end 21a of the magnet 21. This is also applicable to the case where the magnet 25 protrudes forward. In FIG. 15, especially both the magnets 21 and 25 are shown to protrude forward in the predetermined direction 91.

For the same reason as discussed in the second embodiment, in the present embodiment, both ends of the rotor 2c in the predetermined direction 91 also desirably have recesses for exposing the ends 21a and 25a of the magnets 21 and 25.

Fifth Embodiment

Figure 16:
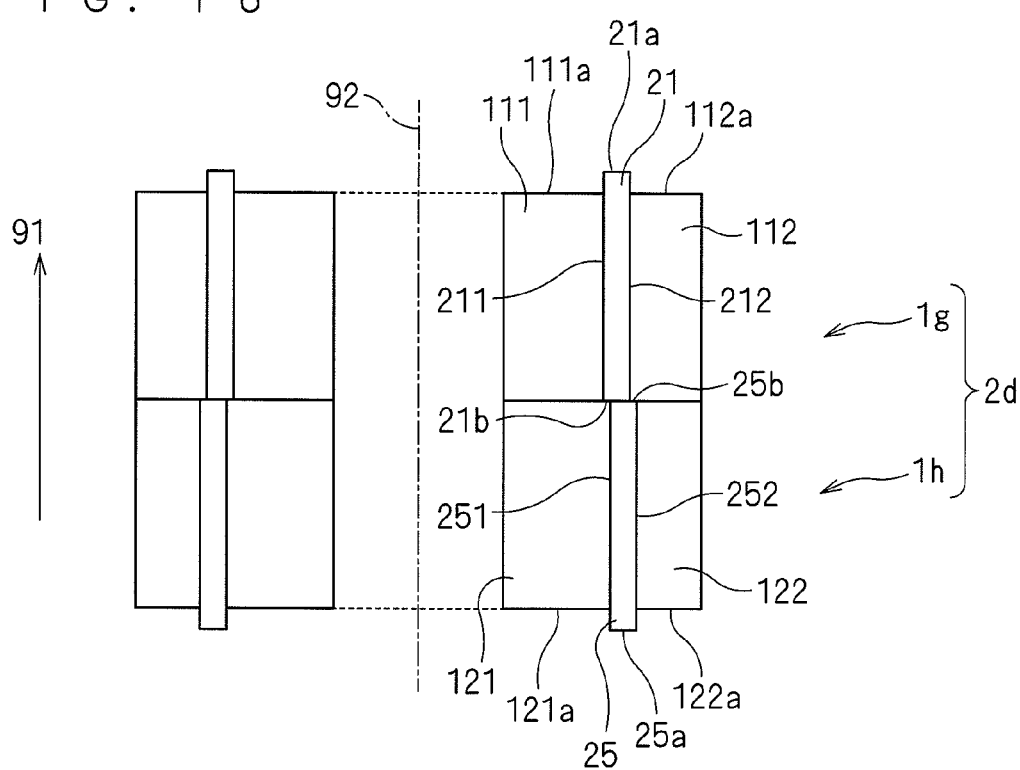
FIG. 16 conceptually shows a cross section of a rotor 2d discussed in a fourth embodiment.
Figure 17:
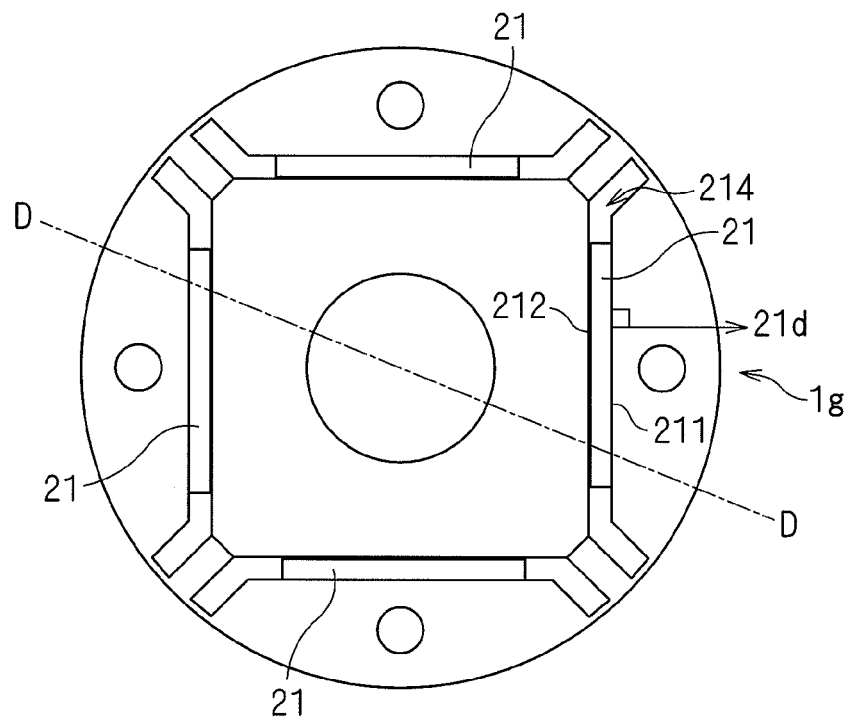
FIGS. 17 and 18 conceptually shows a cross section of the rotor 1g taken in a plane perpendicular to the predetermined direction 91.
Figure 18:
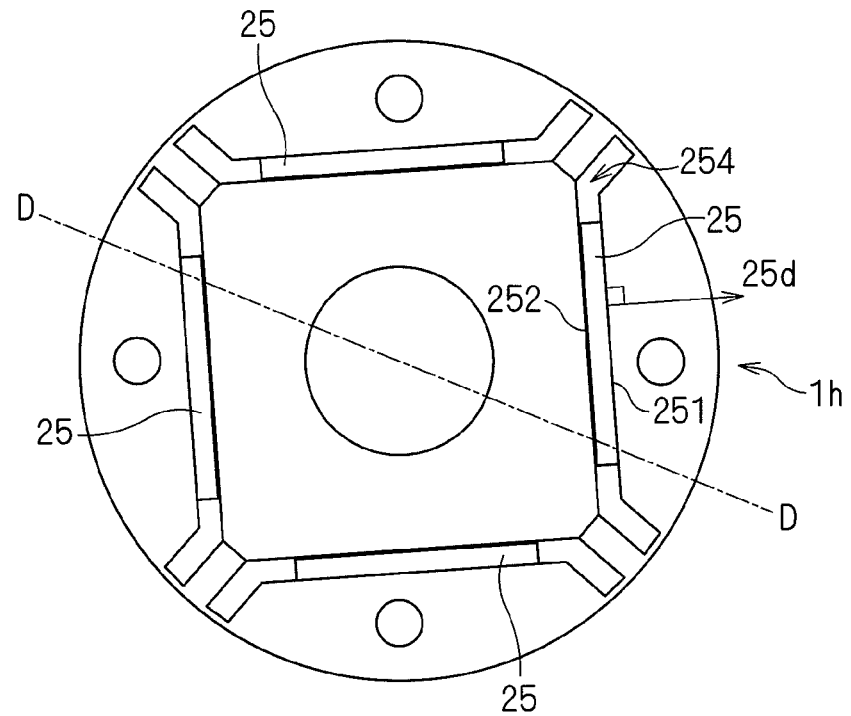

FIG. 16 conceptually shows a cross section of a rotor 2d according to a fifth embodiment. The rotor 2d has rotors 1g and 1h coupled to each other in the predetermined direction 91. The cross sections of the rotors 1d and 1h in a plane perpendicular to the predetermined direction 91 are respectively shown in FIGS. 17 and 18. The cross section shown in FIG. 16 is taken along dashed-dotted lines D-D indicated in FIGS. 17 and 18.

With reference to the rotor 1d shown in FIG. 8, in the rotor 1g, one end 21a of the magnet in the predetermined direction 91 protrudes forward while the other end 21b is flat in the predetermined direction 91 with respect to the ends 111b and 112b of the parts 111 and 112. The rotor 1h has a core with parts 121 and 122, and a magnet 25, and has the same structure as that of the rotor 1g. Namely, the parts 121 and 122 respectively correspond to the parts 111 and 112, the magnet 25 corresponds to the magnet 21, and ends 25a and 25b of the magnet 25 in the predetermined direction 91 respectively correspond to the ends 21 and 21b.

The rotor 1g is coupled to the rotor 1h in the predetermined direction 91. At this time, a normal direction 21d to the pole face 212 of the magnet 21 is tilted from a normal direction 25d to the pole face 252 of the magnet 25.

Figure 19:
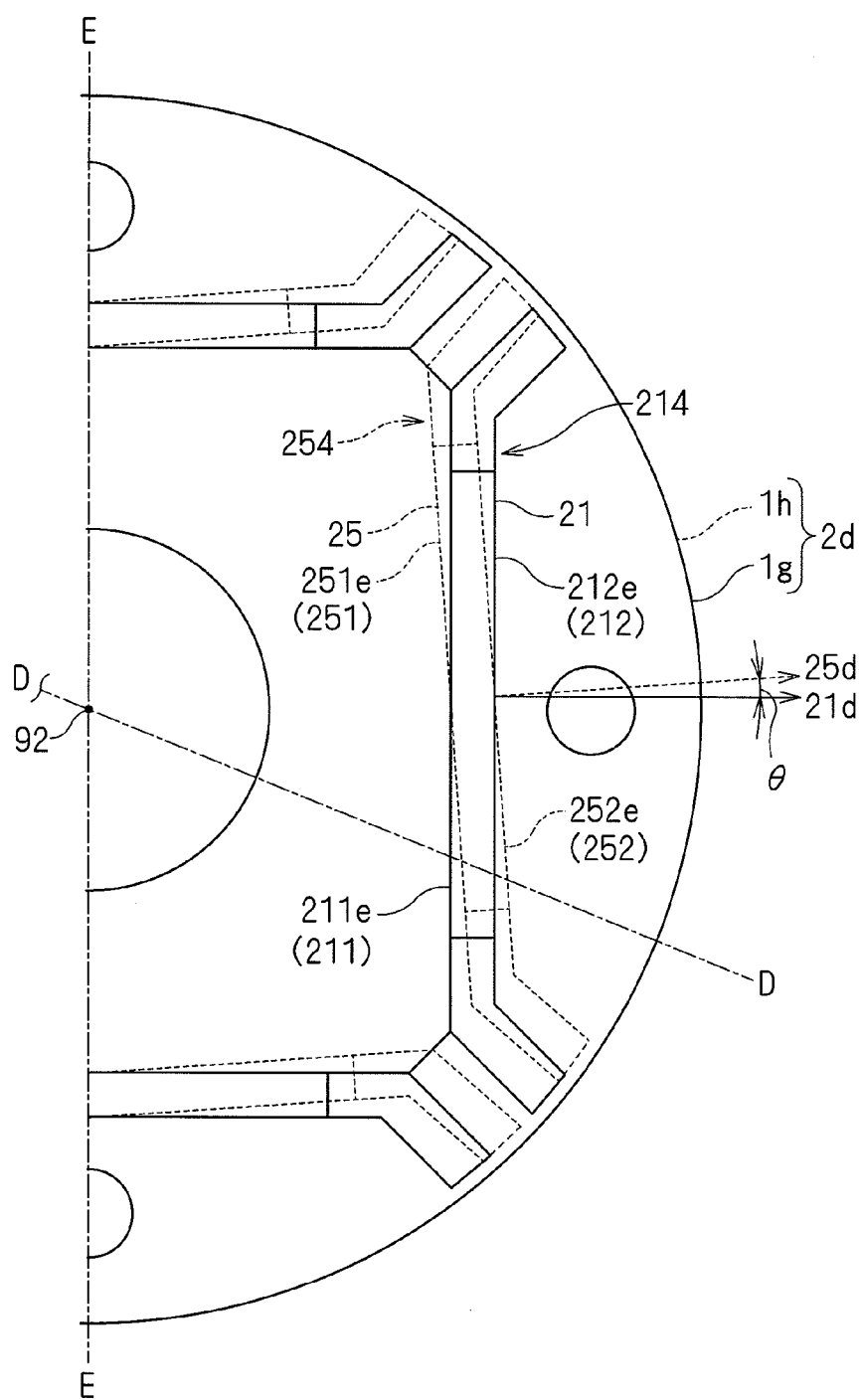
FIG. 19 shows exemplary relative positions of rotors 1g and 1h when viewed in the predetermined direction 91.

FIG. 19 shows exemplary relative positions of the rotors 1g and 1h when viewed in the predetermined direction 91. The shapes of the rotors 1g and 1h shown in FIG. 19 are formed by protruding the rotors 1g and 1h in the predetermined direction 91 onto a plane that is perpendicular to the predetermined direction 91. Only one side of the rotor 2d with respect to a dashed-dotted line E-E passing through the rotation axis 92 is shown. The rotors 1g is indicated by solid lines and the rotor 1h is indicated by broken lines. The normal direction 25d in the rotor 1h is tilted in a counterclockwise direction about the rotation axis 92 from the normal direction 21d at a predetermined angle θ.

A hole 254 into which the magnet 25 is buried is therefore defined by rotating a hole 214 into which the magnet 21 is buried at the predetermined angle θ about the rotation axis 92. In the below, these relative positions of the holes 214 and 215 are described by the expression that "step skew of holes is defined".

Thus, with reference to the magnets 21 and 25 respectively buried in the holes 214 and 254, the position of the magnet 25 is defined by rotating the position of the magnet 21 at the predetermined angle θ about the rotation axis 92 when viewed in the predetermined direction 91. In the below, these relative positions of the magnets 21 and 25 are described by the expression that "step skew of magnets is defined".

It is especially desirable that an outer edge 212e of the magnet 21 on the plane of projection (projected pole face 212) and an inner edge 251e of the magnet 25 on the plane of projection (projected pole face 251) do not intersect with each other. It is also desirable that an inner edge 211e of the magnet 21 on the plane of projection (projected pole face 211) and an outer edge 252e of the magnet 25 on the plane of projection (projected pole face 252) do not intersect with each other. This is because no magnetic material is held between the pole faces 211 and 252, and between the pole faces 212 and 251, which prevents a short circuit of magnetic flux from one pole face to another pole face that are opposite in polarity and belong to the different magnets 21 and 25.

Turning back to FIG. 16, the end 21a of the magnet 21 protrudes forward in the predetermined direction 91 and on the side opposite to the rotor 1h with respect to both the parts 111 and 112. The end 25a of the magnet 25 protrudes forward in a direction opposite to the predetermined direction 91 and on the side opposite to the rotor 1h with respect to both the ends 121 and 122.

In the rotor 2d, step skew of the magnets 21 and 25 is defined to thereby reduce torque ripple. Further, the respective ends of the magnets 21 and 25 parallel to the predetermined direction 91 protrude forward. This produces the same effect as that discussed in the first embodiment.

Sixth Embodiment

Figure 20:
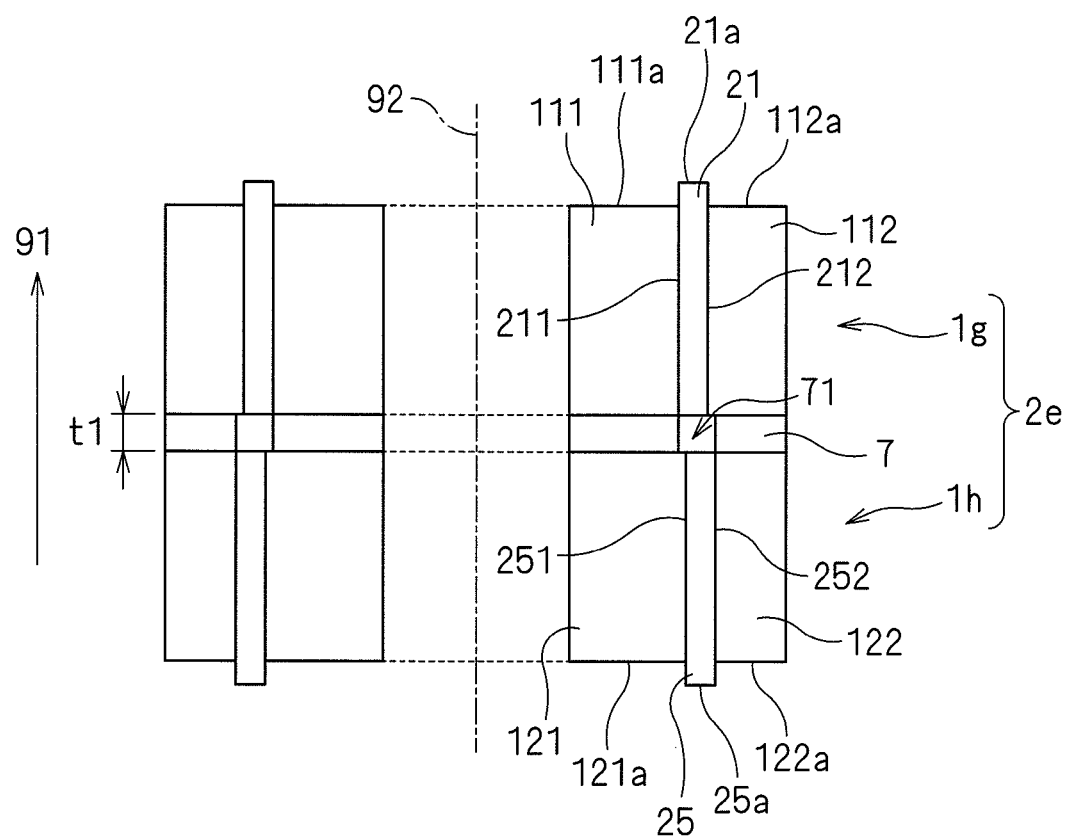
FIG. 20 conceptually shows a cross section of a rotor 2e discussed in a sixth embodiment.

FIG. 20 conceptually shows a cross section of a rotor 2e according to a sixth embodiment. With reference to the rotor 2d discussed in the fifth embodiment, the rotor 2e is formed by the rotors 1g and 1h coupled to each other through a magnetic plate 7. The cross sections of the rotor 1g, the magnetic plate 7 and the rotor 1h in a plane perpendicular to the predetermined direction 91 are respectively shown in FIGS. 21, 22 and 23. The cross section shown in FIG. 20 is taken along dashed-dotted lines F-F indicated in FIGS. 21 to 23. The same reference numerals are applied to the constituent parts of FIGS. 20, 21 and 23 that correspond to those parts discussed in the fifth embodiment.

Figure 21:
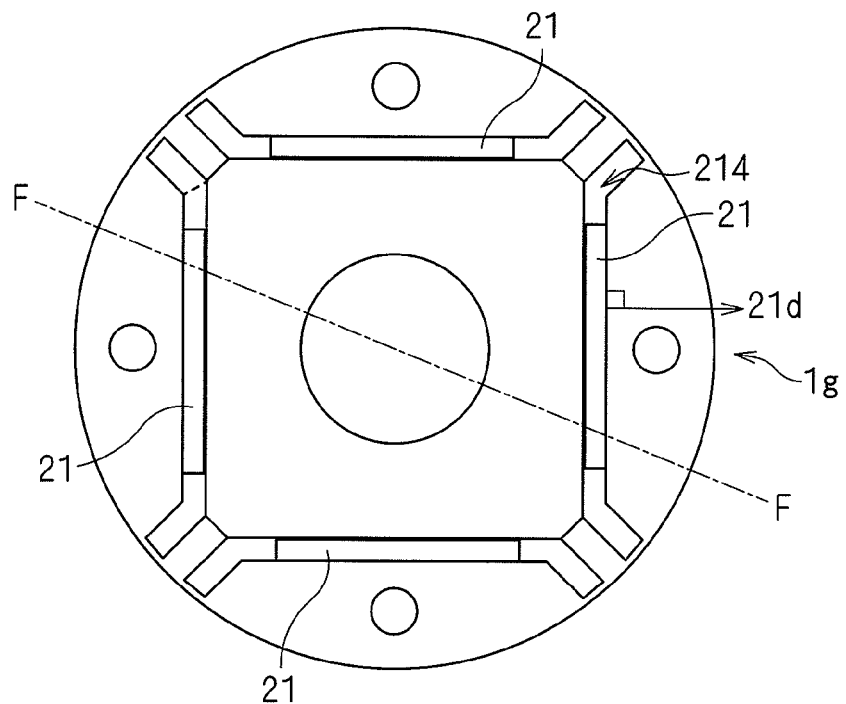
FIG. 21 conceptually shows a cross section of the rotor 1g taken in a plane perpendicular to the predetermined direction 91.
Figure 23:
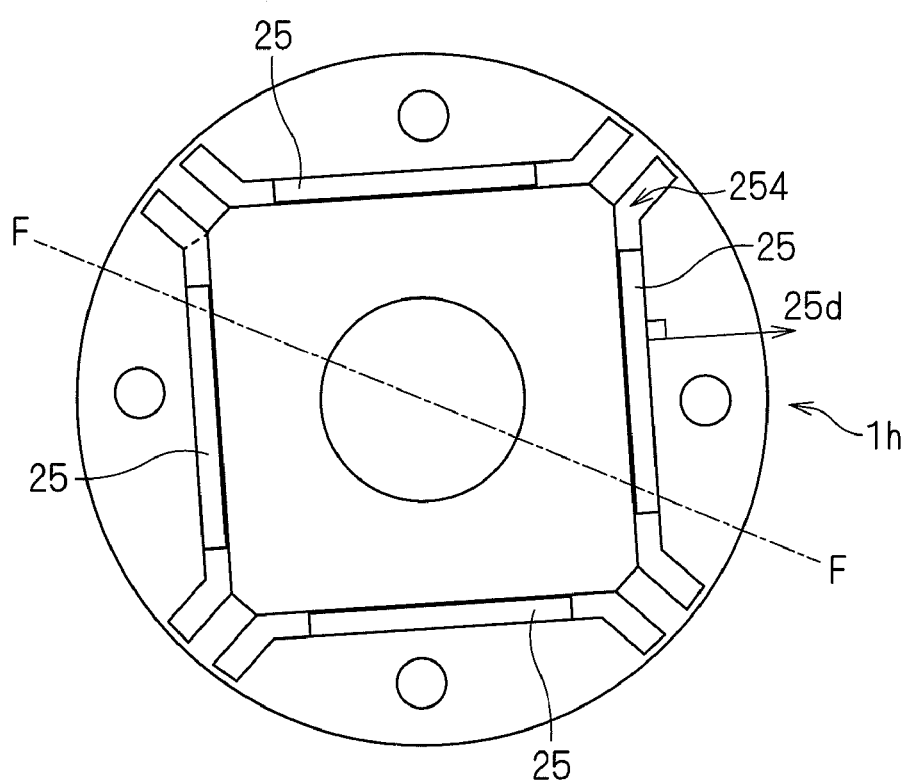
FIG. 23 conceptually shows a cross section of a rotor 1h taken in a plane perpendicular to the predetermined direction 91.

The rotors 1g and 1h have holes 214 and 254 into which the magnets 21 and 25 are respectively buried (FIGS. 21 and 23).

Figure 22:
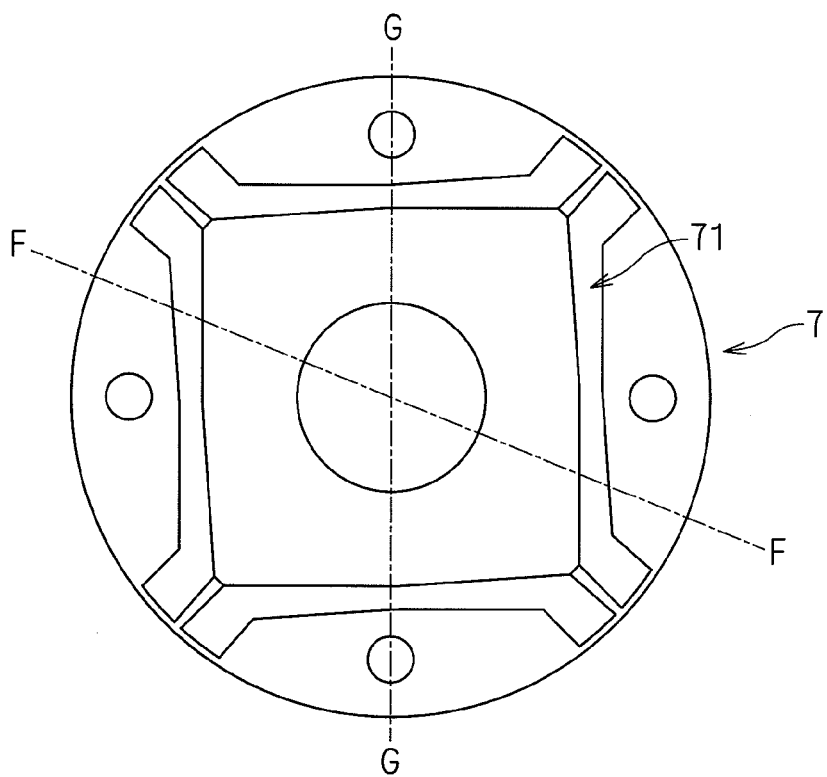
FIG. 22 conceptually shows a cross section of a magnetic plate 7 taken in a plane perpendicular to the predetermined direction 91.
Figure 24:
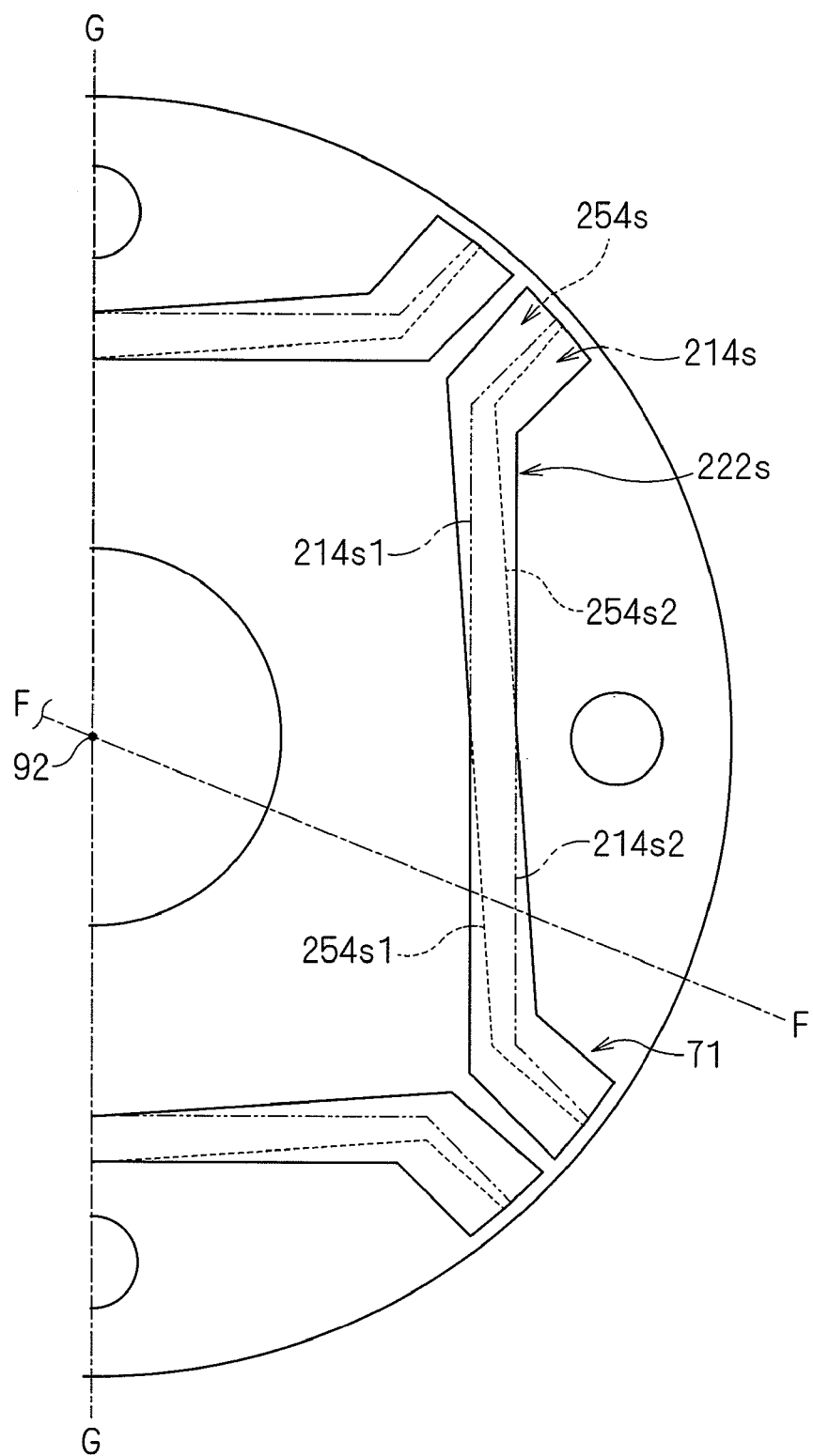
FIG. 24 is an enlarged view of the cross section of the magnetic plate 7.

FIG. 24 is an enlarged view of the cross section of FIG. 22, showing only one side of the magnetic plate 7 with respect to a dashed-dotted line G-G passing through the rotation axis 92. The magnetic plate 7 has a through hole 71. The through hole 71 penetrates the magnetic plate 7 in the predetermined direction 91 in an area 222s that includes projections 214s and 254s formed by projecting the holes 214 and 254 respectively onto the magnetic plate 7 in a plane perpendicular to the predetermined direction 91, and extends from either the projection 214s or 254s to either the projection 254s or 214s.

In the rotor 2e, the through hole 71 provides a gap equal to or greater than the respective depths of the magnets 21 and 25 in the circumferential direction of the magnetic plate 7. Thus magnetic flux is unlikely to be short-circuited at the through hole 71 in the circumferential direction of the magnetic plate 7.

By way of example, the shape of the through hole 71 may be such that the cross section thereof in a plane perpendicular to the predetermined direction 91 is the same for example with the cross sections of the holes 214 and 215 in the plane perpendicular to the predetermined direction 91. In this case, the through hole 71 may penetrate either through the hole 214 or through the hole 215 to thereby communicatively couple the holes 21 and 25. At this time, the through hole 71 may have a smooth side surface. Alternatively, when the magnetic plate 7 is formed by stacking magnetic steel sheets in the predetermined direction 91, the through hole 71 may have a stepwise structure extending from either the hole 214 or 215 to either the hole 25 or 21.

It is especially desirable that an outer edge 214s2 of the projection 214s and an inner edge 254s1 of the projection 254s do not intersect with each other. It is further desirable that an inner edge 214s1 of the FIG. 214s and an outer edge 254s2 of the FIG. 254s do not intersect with each other. This is because no magnetic material is held between the pole faces 211 and 252, and between the pole faces 212 and 251, which prevents a short circuit of magnetic flux from one pole face to another pole face that are opposite in polarity and belong to the different magnets 21 and 25.

Even when a magnetic material is held between the pole faces 211 and 252, and between the pole faces 212 and 251, in an aspect discussed next, magnetic flux is unlikely to be short-circuited from one pole face to another pole face that are opposite in polarity and belong to the different magnets 21 and 25. In this aspect, a thickness t1 of the magnetic plate 7 in the predetermined direction 91 (FIG. 20) is greater at least than either the thickness of the magnet 21 or that of the magnet 25.

Figure 25:
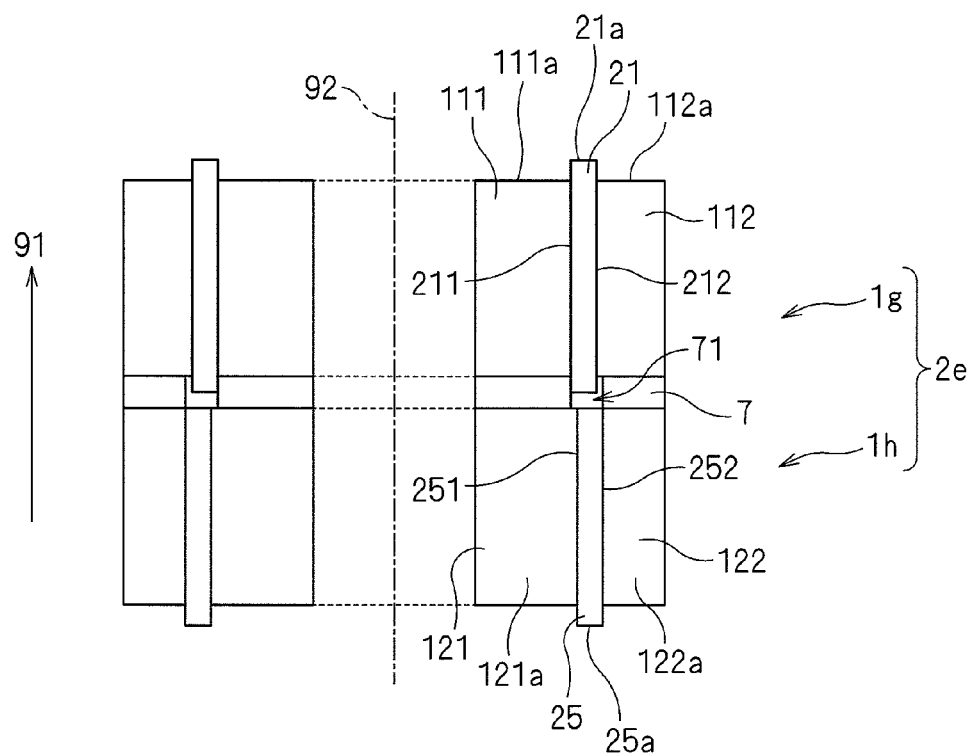
FIG. 25 conceptually shows a cross section of an aspect in which a magnet protrudes into a through hole.

In one aspect of the rotor 2e, at least either the magnet 21 or 25 may protrude into the through hole 71 as shown in FIG. 25. In this case, magnetic flux is unlikely to be short-circuited from either the pole face 211 or 212 (from either the pole face 251 or 252) to either the pole face 212 or 211 (to either the pole face 252 or 251) of the same protruding magnet 21 (25) by passing the ends of the magnet 21 (25), even when the magnets 21 and 25 are not in contact with each other.

Seventh Embodiment

Figure 26:
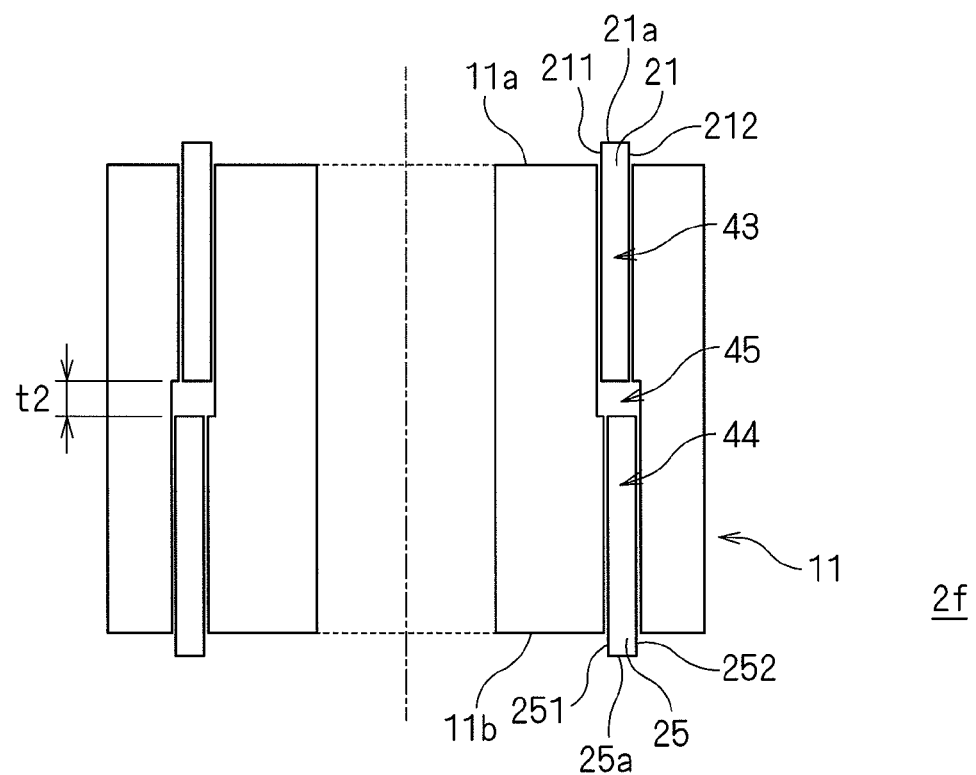
FIG. 26 conceptually shows a cross section of a rotor 2f discussed in a seventh embodiment.

The rotor 2e discussed in the sixth embodiment is not necessarily formed by coupling the rotors 1g and 1h through the magnetic plate 7. This case is shown as a rotor 2f in FIG. 26.

The rotor 2f has a core 11, and magnets 21 and 25. The core 11 extends in a predetermined direction 91, and has holes 43, 44 and a cavity 45. The magnet 21 has pole faces 211 and 212, and the magnet 25 has poles faces 251 and 252.

With reference to the rotor 2e shown for example in FIG. 20, the rotor 2f is seen as integration of the rotors 1g, 1h and the magnetic plate 7. More specifically, the holes 43 and 44 are respectively regarded as the holes 214 and 254 (FIGS. 21 and 23), and the cavity 45 is regarded as the through hole 71 (FIG. 20).

The cavity 45 is defined between ends 11a and 11b of the core 11 in the predetermined direction 91. The hole 43 extends from the end 11a in the predetermined direction 91 to protrude into the cavity 45. The hole 44 extends from the end 11b in the predetermined direction 91 to protrude into the cavity 45.

Figure 27:
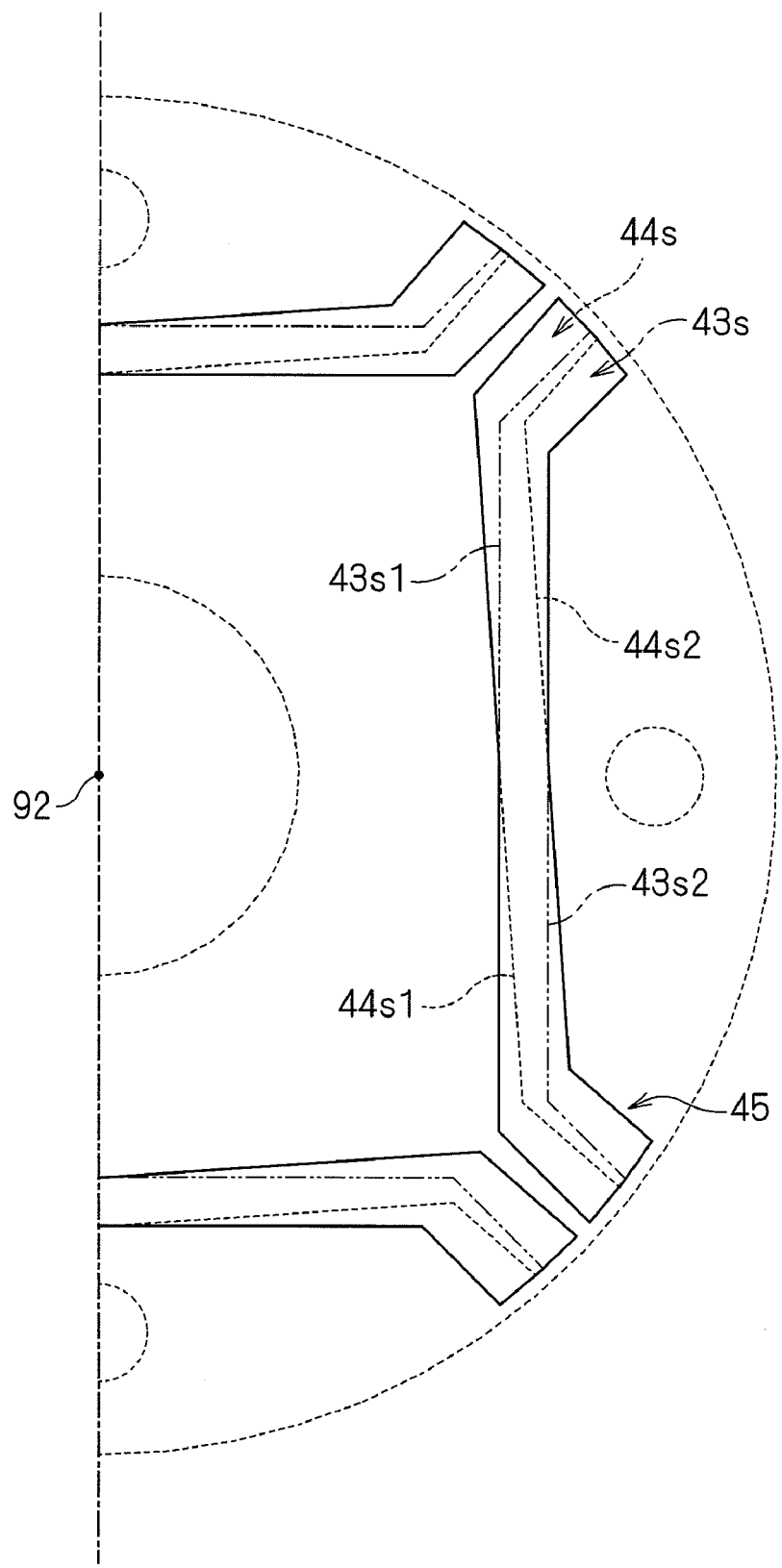
FIG. 27 conceptually shows a cross section of a cavity 45 taken in a plane perpendicular to the predetermined direction 91.

FIG. 27 shows a cross section of the cavity 45 in a plane perpendicular to the predetermined direction 91. The cross section of the cavity 45 includes both projections 43s and 44s formed by projecting the holes 43 and 44 in onto a plane perpendicular to the predetermined direction 91. The cross-sectional area of the cavity 45 in a plane perpendicular to the predetermined direction 91 is greater than those of both the holes 43 and 44 in the plane perpendicular to the predetermined direction 91.

The magnets 21 and 25 are respectively inserted into the holes 43 and 44. As a more specific example, the magnets 21 and 25 are inserted into the holes 43 and 44 from the ends 11a and 11b of the core 11 respectively. At this time, the pole faces 211 and 212 of the magnet 21, and the pole faces 251 and 252 of the magnet 25 extend in the predetermined direction 91.

In the rotor 2f, step skew of the holes 43 and 44 is defined to thereby define step skew of the magnets 21 and 25 respectively inserted into the holes 43 and 44. Further, as a result of the presence of the cavity 45, magnetic flux is unlikely to be short-circuited from either the pole faces 211 or 212 to either the pole face 212 or 211 of the same magnet 21, and from either the pole face 251 or 252 to either the pole face 252 or 251 of the same magnet 25 by passing through the ends of the magnets 21 and 25, even when the two magnets 21 and 25 are not in contact with each other.

With reference to FIG. 27, it is especially desirable that an outer edge 43s2 of the projection 43s and an inner edge 44s1 of the projection 44s do not intersect with each other. It is further desirable that an inner edge 43s1 of the projection 43s and an outer edge 44s2 of the projection 44s do not intersect with each other. This is because no magnetic material is held between the pole faces 211 and 252, and between the pole faces 212 and 251, which prevents a short circuit of magnetic flux from one pole face to another pole face that are opposite in polarity and belong to the different magnets 21 and 25.

Even when a magnetic material is held between the pole faces 211 and 252, and between the pole faces 212 and 251, magnetic flux is unlikely to be short-circuited from one pole face to another pole face that are opposite in polarity and belong to the different magnets 21 and 25. In this case, a thickness t2 of the cavity 45 in the predetermined direction 91 (FIG. 26) is set to be greater at least than either the thickness of the magnet 21 or the magnet 25.

In one aspect of the rotor 2f, at least either the magnet 21 or 25 may protrude into the cavity 45.

Eighth Embodiment

Figure 28:
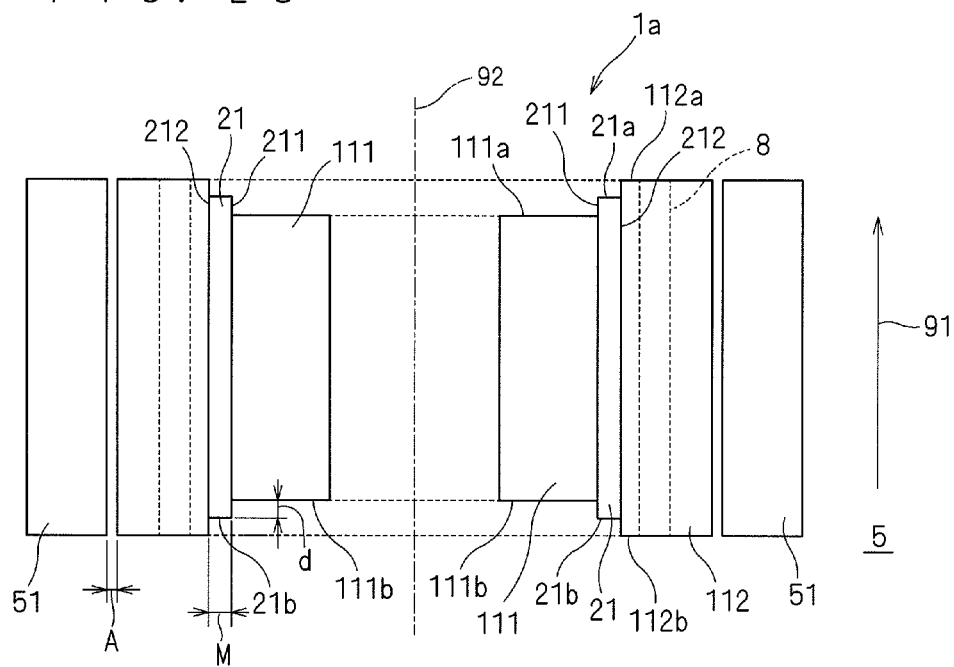
FIG. 28 conceptually shows a cross section of a motor 5 discussed in an eighth embodiment.

The rotors 1a through 1d and 2a through 2c discussed in the first through fourth embodiments are applicable for example to a motor equipped with a stator. FIG. 28 shows a cross section of a motor 5 equipped especially with the rotor 1a. Like the cross section shown in FIG. 2, the cross section of FIG. 28 is taken along the cutting plane C-C indicated in FIG. 1.

In the motor 5, the rotor 1a is rotatably arranged about the rotation axis 92 extending in the predetermined direction 91. The stator 51 is coaxially with and faces the rotor 1a.

The stator 51 has a coil (not shown) with which magnetic flux flowing from the rotor 1a links. In terms of core loss reduction, it is desirable that an intended alternating current obtained for example by PWM control by an inverter is applied to this coil. Such an alternating current may be a sinusoidal current with intended amplitude and cycle. It is desirable that this coil is of a concentrated winding type. This is because a coil end length is reduced, which contributes to downsizing of the motor as a whole. This is also because magnetic flux can be efficiently linked with the coil of the stator 51 even in a reverse magnetic field without causing magnetic flux leakage at the end of the magnet 21.

The above-discussed rotor 1a is employed as a rotor in the motor 5. Thus the drive efficiency and drive output of the motor 5 are improved. This is also applicable to the case where any of the rotors 1b through 1d, and 2a through 2c is employed as a rotor in the motor 5.

A height d of the magnet 21 from the end 111b of the part 111 of the core 11 taken along the rotation axis 92 is desirably smaller than a distance M between the pole faces 211 and 212 of the same magnet 21 for the reason given next. That is, magnetic flux is unlikely to be short-circuited from the pole face 211 to the pole face 212 by passing through the end 21b of the magnet 21. This is because, when magnetic flux generated at the protruding portion of the magnet 21 flows into the part 111, the magnetic flux passes through a non-magnetic part such as air a shorter distance as compared to the case where the magnetic flux flows into the end 21b of the magnet 21. As a result, magnetic resistance is reduced. This is also applicable to the side of the end 21a of the magnet 21.

In any of the motors according to the present embodiment as well as in the motor 5, it is desirable that the distance M is greater than a distance A between the rotors 1a through 1d and 2a through 2c, and the surface of the stator 51 facing these rotors for the reason given next. That is, a short circuit is unlikely to occur from the pole face 212 to the pole face 211 by passing through the ends 21a and 21b of the magnet 21. Namely, magnetic flux flows into the stator 51 in large quantities. This is because the flow of magnetic flux into the stator 51 results in smaller magnetic resistance.

The motor discussed in the present embodiment can be mounted for example on a compressor, in which case effective compression for example of a refrigerant is realized.

In each of the embodiments described above, the core 11 may be a stack of magnetic steel sheets. Further, application for example of dust core is desirable in terms of reduction of eddy current.

The core 11 may have means for determining the position of the magnet 21 with respect to the core 11, or means for fixing the magnet 21 at the position thereby determined.

As an example, when the ends 21a and 21b of the magnet 21 are flat with the ends 11a and 11b of the core 11 as in the rotor 1d shown in FIG. 11, the core 11 may be held for example by end plates from both sides of the core 11 in the predetermined direction 91 to thereby fix the magnet 21.

As an example, when the ends 21a and 21b of the magnet 21 are depressed with respect to the ends 11a and 11b of the core 11 as in the rotor 1a shown in FIG. 10, spacers formed by non-magnetic materials and the like may be inserted into these depressions. In this case, the core 11 may be held for example by end plates from both sides of the core 11 in parallel to the predetermined direction 91 to thereby fix the magnet 21.

Figure 29:
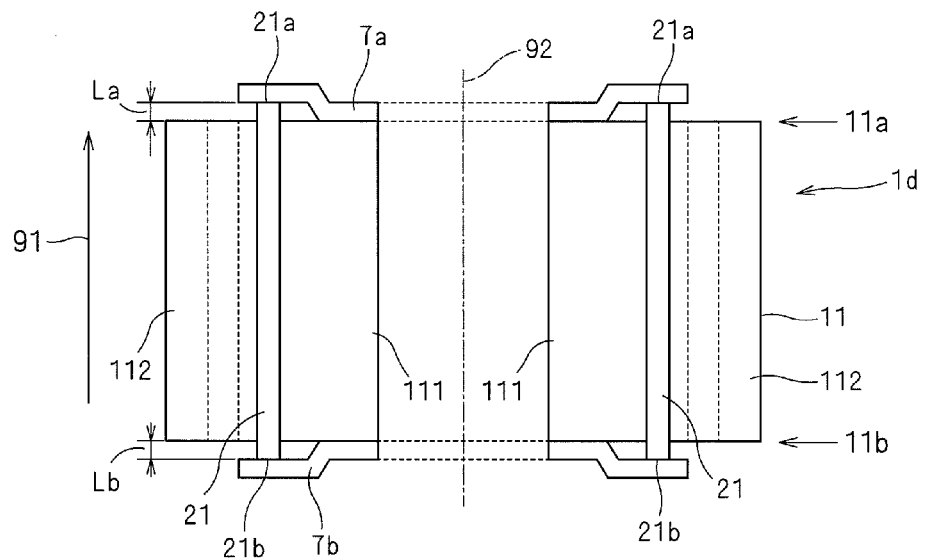
FIG. 29 conceptually shows a cross section of an aspect in which a magnet is fixed by end plates.

As an example, when the magnet 21 protrudes forward with respect to the ends 11a and 11b of the core 11 as in the rotor 1d shown in FIG. 8, an example shown for example in FIG. 29 is applicable to fix the magnet 21. In this example, the rotor 1d is held from both sides in parallel to the predetermined direction 91 by end plates 7a and 7b. The end plates 7a and 7b are depressed on the side of the part 111 in the predetermined direction 91 by heights La and Lb that respectively correspond to the protruding parts of the ends 11a and 11b of the magnet 21.

Figure 30:
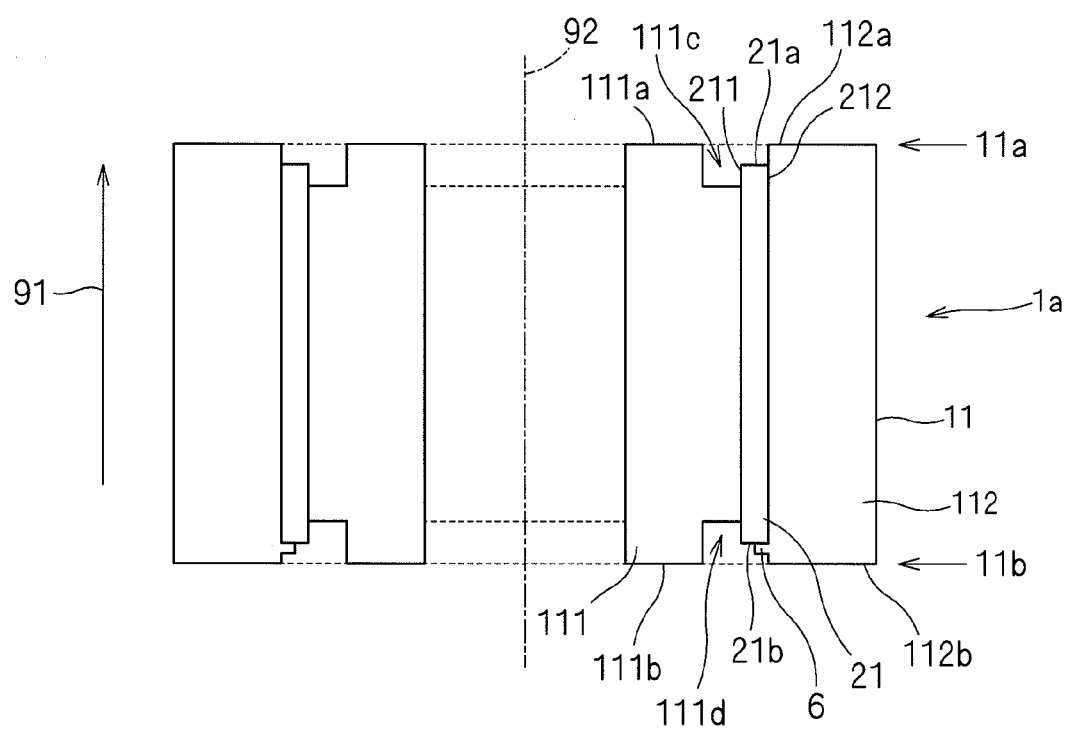
FIG. 30 conceptually shows a cross section of a rotor provided with a protrusion.
Figure 31:
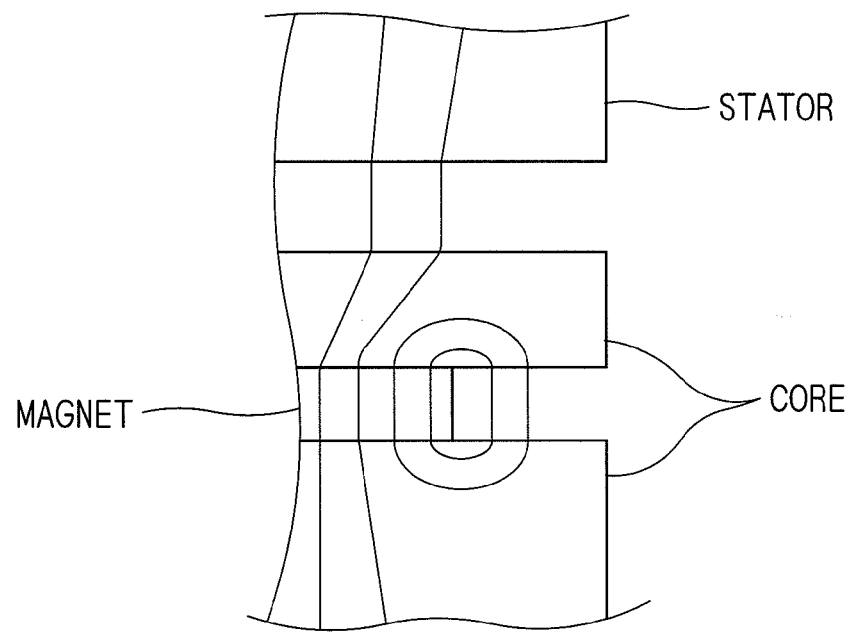
FIGS. 31 and 32 shows magnetic flux flowing in a conventional rotor by magnetic lines of force.
Figure 32:
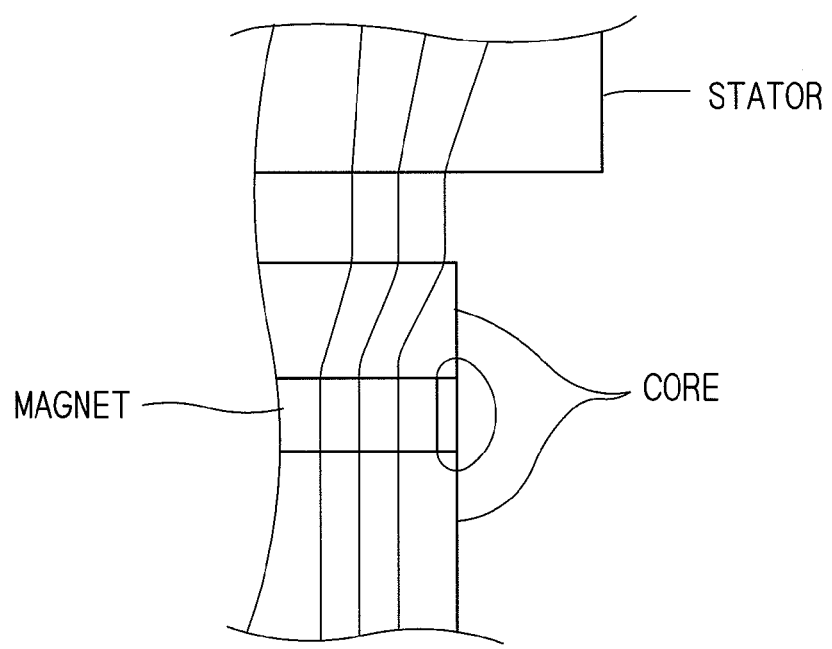

As an example, the core 11 may have a protrusion 6 for realizing positioning and fixation of the magnet 21 as shown in FIG. 30. The protrusion 6 is arranged such that the positions of the ends 21a and 21b of the magnet 21 are determined, for example. It is desirable that the degree of the protrusion 6 is controlled such that magnetic flux is not short-circuited through the protrusion 6.

In each of the embodiments described above, a magnet is desirably a rare-earth permanent magnet that provides a large energy product. It is especially desirable to employ a sintered magnet of Md—Fe—B system in terms of increase of the amount of magnetic flux.

While the invention has been shown and described in detail, the foregoing description is in all aspects illustrative and not restrictive. It is therefore understood that numerous modifications and variations can be devised without departing from the scope of the invention.

The invention claimed is:

1. A rotor comprising:
a core extending in a predetermined direction; and
a magnet buried in said core and having pole faces extending in said predetermined direction,
said core having a first part formed by a magnetic material and facing one of said pole faces,
at least one of ends of said magnet defined in said predetermined direction protruding forward in parallel to said predetermined direction with respect to an end of said first part, said end of said first part being on the same side with said at least one of said ends of said magnet,
said magnet including a plurality of magnets arranged in a loop,
said core having first gaps and second gaps both extending in said predetermined direction,
each of said first gaps extending in a first direction perpendicular to said predetermined direction, each of said first gaps holding said magnet buried therein,
each of said second gaps being defined at an end of each of said first gaps in said first direction, each of said second gaps extending in a second direction perpendicular to said predetermined direction,
said core further having a third part formed by a magnetic material and arranged between adjacent ones of said second gaps, and
at least one of ends of said third part defined in said predetermined direction protruding forward in said predetermined direction with respect to the ends of said adjacent ones of said magnets, said ends of said adjacent ones of said magnets being on the same side with at least one of said ends of said third part.

2. The rotor according to claim 1, wherein
both of said ends of said magnet protrude forward with respect to the ends of said first part, said ends of said first part being on the same sides with corresponding ones of said ends of said magnet,
a length of said magnet in said predetermined direction satisfies a ratio not more than 1.075 to a length of said first part in said predetermined direction, and
said magnet has a thickness of 1.5 mm to 4 mm.

3. The rotor according to claim 1, wherein said ends of said first part have recesses for exposing said ends of said magnet.

4. The rotor according to claim 1, wherein
said core further has a second part formed by a magnetic material and facing another one of said pole faces, and
at least one of said ends of said magnet protrudes forward in said predetermined direction with respect to an end of said second part, said end of said second part being on the same side with said at least one of said ends of said magnet.

5. The rotor according to claim 4, wherein said ends of said second part have recesses for exposing said ends of said magnet.

6. A motor, comprising:
the rotor as recited in claim 1, said rotor rotating about a rotation axis extending in said predetermined direction; and
a stator arranged coaxially with said rotor and facing said rotor.

7. The motor according to claim 6, wherein
a height of said magnet from said end of said core taken along said rotation axis is smaller than a distance between said pole faces of the same magnet, said end of said core being on the side opposite to said stator with respect to said magnet.

8. The motor according to claim 6, wherein
a distance between said pole faces of the same magnet is greater than a distance between a side surface of said rotor and a surface of said stator facing said side surface.

9. A compressor comprising the motor as recited in claim 6.

10. A rotor comprising:
a core extending in a predetermined direction; and
a magnet buried in said core and having pole faces extending in said predetermined direction,
said core having a first part formed by a magnetic material and facing one of said pole faces,
at least one of ends of said magnet defined in said predetermined direction protruding forward in parallel to said predetermined direction with respect to an end of said first part, said end of said first part being on the same side with said at least one of said ends of said magnet,
said magnet including a plurality of magnets arranged in a loop,
said core having first gaps and second gaps both extending in said predetermined direction,
each of said first gaps extending in a first direction perpendicular to said predetermined direction, each of said first gaps holding said magnet buried therein,
each of said second gaps being defined at an end of each of said first gaps in said first direction, each of said second gaps extending in a second direction perpendicular to said predetermined direction,
said core further having a third part formed by a magnetic material and arranged between adjacent ones of said second gaps, and
a width of said second gap defined in a direction perpendicular to both of said predetermined direction and said second direction being greater than a distance between said pole faces of said magnet.

11. The rotor according to claim 10, wherein
both of said ends of said magnet protrude forward with respect to the ends of said first part, said ends of said first part being on the same sides with corresponding ones of said ends of said magnet,
a length of said magnet in said predetermined direction satisfies a ratio not more than 1.075 to a length of said first part in said predetermined direction, and
said magnet has a thickness of 1.5 mm to 4 mm.

12. The rotor according to claim 10, wherein said ends of said first part have recesses for exposing said ends of said magnet.

13. The rotor according to claim 10, wherein
said core further has a second part formed by a magnetic material and facing another one of said pole faces, and
at least one of said ends of said magnet protrudes forward in said predetermined direction with respect to an end of said second part, said end of said second part being on the same side with said at least one of said ends of said magnet.

14. A rotor comprising:
a core extending in a predetermined direction; and
a magnet buried in said core and having pole faces extending in said predetermined direction,
said core having a first part formed by a magnetic material and facing one of said pole faces,
at least one of ends of said magnet defined in said predetermined direction protruding forward in parallel to said predetermined direction with respect to an end of said first part, said end of said first part being on the same side with said at least one of said ends of said magnet,
said rotor including at least first and second rotors coupled together in said predetermined direction,
said magnet protruding forward with respect to the part of said core on the side of at least one of ends of said rotors defined in said predetermined direction, said at least one of said ends having no coupling to another end,
a normal direction to the pole face of the magnet of said first rotor being tilted from a normal direction to the pole face of the magnet of said second rotor, and
in a first projection formed by projecting said magnet of said first rotor onto a predetermined plane perpendicular to said predetermined direction and in a second projection formed by projecting said magnet of said second rotor onto said predetermined plane perpendicular to said predetermined direction, an outer edge of said first projection corresponding to first of said pole faces of said magnet of said first rotor and an inner edge of said second projection corresponding to first of said pole faces of said magnet of said second rotor not intersecting with each other, while an inner edge of said first projection corresponding to second of said pole faces of said magnet of said first rotor and an outer edge of said second projection corresponding to second of said pole faces of said magnet of said second rotor do not intersect with each other.

15. The rotor according to claim 14, wherein
said core further has a second part formed by a magnetic material and facing another one of said pole faces, and
at least one of said ends of said magnet protrudes forward in said predetermined direction with respect to an end of said second part, said end of said second part being on the same side with said at least one of said ends of said magnet.

16. A rotor comprising:
a core extending in a predetermined direction; and
a magnet buried in said core and having pole faces extending in said predetermined direction,
said core having a first part formed by a magnetic material and facing one of said pole faces,
at least one of ends of said magnet defined in said predetermined direction protruding forward in parallel to said predetermined direction with respect to an end of said first part, said end of said first part being on the same side with said at least one of said ends of said magnet,
said rotor including at least first and second rotors coupled together in said predetermined direction,
said magnet protruding forward with respect to the part of said core on the side of at least one of ends of said rotors defined in said predetermined direction, said at least one of said ends having no coupling to another end,
a normal direction to the pole face of the magnet of said first rotor being tilted from a normal direction to the pole face of the magnet of said second rotor,
said first rotor and said second rotor both having holes into which said magnets are buried,
said first rotor and said second rotor being coupled to each other through a magnetic plate,
said magnetic plate having a through hole, and
said through hole penetrating said magnetic plate in said predetermined direction in an area, said area including projections formed by projecting said hole of said first rotor and said hole of said second rotor onto said magnetic plate to said predetermined direction, said area extending from one to the other of said projections.

17. The rotor according to claim 16, wherein
a thickness of said magnetic plate is greater at least than either the thickness of said magnet of said first rotor or the thickness of said magnet of said second rotor.

18. The rotor according to claim 16, wherein
at least either said magnet of said first rotor or said magnet of said second rotor protrudes into said through hole.

19. The rotor according to claim 16, wherein
said core further has a second part formed by a magnetic material and facing another one of said pole faces, and
at least one of said ends of said magnet protrudes forward in said predetermined direction with respect to an end of said second part, said end of said second part being on the same side with said at least one of said ends of said magnet.

20. A rotor comprising:
a core having a hole and a cavity, said core extending in a predetermined direction; and
at least two magnets having pole faces,
said hole penetrating said core through said cavity in said predetermined direction from one end to another end of said core,
said cavity having a cross-sectional area in a plane perpendicular to said predetermined direction that is greater than that of said hole in said plane perpendicular to said predetermined direction,
said cavity being spaced internally from opposite ends of said core in said predetermined direction,
a first one of said magnets being inserted into said hole, the pole faces of said first one of said magnets extending in said predetermined direction,
a second one of said magnets being inserted into said hole on the side opposite to said first one of said magnets with respect to said cavity, the pole faces of said second one of said magnets extending in said predetermined direction, an end of at least one of said magnets with respect to said predetermined direction protruding into said cavity.

21. The rotor according to claim 20, wherein
at least one of said magnets has an end in said predetermined direction that protrudes forward with respect to said end of said core.

22. The rotor according to claims 20, wherein
said first one of said magnets includes a plurality of magnets arranged in a loop,
said core has gaps extending in said predetermined direction,
each of said gaps is defined at an end of each said hole in a first direction perpendicular to said predetermined direction, each of said gaps extends in a second direction perpendicular to said predetermined direction,
said core further has a third part formed by a magnetic material and arranged between adjacent ones of said gaps, and
a width of each of said gaps defined in a direction perpendicular to both of said predetermined direction and said second direction is greater than a distance between said pole faces of said magnet.

23. A motor, comprising:
the rotor as recited in claim 20, said rotor rotating about a rotation axis extending in said predetermined direction; and
a stator arranged coaxially with said rotor and facing said rotor.

24. A rotor with a cavity, and first and second holes, said rotor comprising:
a core extending in a predetermined direction; and
first and second magnets having pole faces,
said first hole extending in said predetermined direction from an end of said core defined in said predetermined direction to communicate with said cavity,
said second hole extending in said predetermined direction from another end of said core defined in said predetermined direction to communicate with said cavity,
said cavity being located between said first hole and said second hole,
the cross section of said cavity taken in a plane perpendicular to said predetermined direction including both first and second projections formed by projecting said first and second holes onto said plane perpendicular to said predetermined direction, said cross section having an area greater than those of both said first and second holes in said plane perpendicular to said predetermined direction,
said first magnet being inserted into said first hole, the pole faces of said first magnet extending in said predetermined direction,
said second magnet being inserted into said second hole, the pole faces of said second magnet extending in said predetermined direction.

25. The rotor according to claim 24, wherein
an outer edge of said first projection corresponding to first of said pole faces of said first magnet and an inner edge of said second projection corresponding to first of said pole faces of said second magnet do not intersect with each other, an inner edge of said first projection corresponding to second of said pole faces of said first magnet and an outer edge of said second projection corresponding to second of said pole faces of said second magnet do not intersect with each other, said outer edge of said first projection and said outer edge of said second projection intersecting with each other, and said inner edge of said first projection and said inner edge of said second projection intersect with each other.

26. The rotor according to claim 24, wherein
said first magnet including a plurality of magnets arranged in a loop,
said core has gaps extending in said predetermined direction,
each of said gaps is defined at an end of each said first hole in a first direction perpendicular to said predetermined direction, each of said gaps extending in a second direction perpendicular to said predetermined direction,
said core further having a third part formed by a magnetic material and arranged between adjacent ones of said gaps, and
a width of each of said gaps defined in a direction perpendicular to both of said predetermined direction and said second direction is greater than a distance between said pole faces of said magnet.

27. A motor, comprising:
the rotor as recited in claim 24, said rotor rotating about a rotation axis extending in said predetermined direction; and
a stator arranged coaxially with said rotor and facing said rotor.

28. A core with first and second parts formed by magnetic materials, said first and second parts both extending in a predetermined direction,
said first and second parts facing each other through a gap extending in said predetermined direction,
at least one of ends of said first part defined in said predetermined direction protruding forward in said predetermined direction with respect to an end of said second part, said end of said second part being on the same side with said at least one of said ends of said first part;
two or more of the first parts;
second gaps extending in said predetermined direction; and
a plurality of third parts formed by magnetic materials, said third parts extending in said predetermined direction, wherein
each of said second gaps is defined at an end of each said gap in a first direction perpendicular to said predetermined direction, each of said second gaps extending in a second direction perpendicular to said predetermined direction,
each of said plurality of third parts is arranged between adjacent ones of said second gaps,
said first parts and said plurality of third parts are alternately arranged in a loop around said second part, and
at least one of ends of said third part in said predetermined direction protrudes forward in said predetermined direction with respect to said end of said second part, said end of said second part being on the same side with said at least one of said ends of said third part.

29. The core according to claim 28, wherein
an end of said gap defined in said predetermined direction extends toward said second part.

30. A core with first and second parts formed by magnetic materials, said first and second parts both extending in a predetermined direction,
said first and second parts facing each other through a gap extending in said predetermined direction,
an end of said gap defined in said predetermined direction extending toward said first and second parts, at least one of ends of said first part defined in said predetermined direction protruding forward in said predetermined direction with respect to an end of said second part, said end of said second part being on the same side with said at least one of said ends of said first part;

second gaps extending in said predetermined direction;

two or more of the first parts; and a plurality of third parts formed by magnetic materials, said third parts extending in said predetermined direction, wherein each of said second gaps is defined at an end of each said gap in a first direction perpendicular to said predetermined direction, each of said second gaps extending in a second direction perpendicular to said predetermined direction, each of said third parts is arranged between adjacent ones of said second gaps, said first parts and said plurality of third parts are alternately arranged in a loop around said second part, and at least one of ends of said third part in said predetermined direction protrudes forward in said predetermined direction with respect to said end of said second part, said end of said second part being on the same side with said at least one of said ends of said third part.

31. A core extending in a predetermined direction, comprising:

a cavity;

a first hole extending in said predetermined direction from one end of said core to protrude into said cavity; and a second hole extending in said predetermined direction from another end of said core to protrude into said cavity, said cavity being located between said first hole and said second hole, the cross section of said cavity taken in a plane perpendicular to said predetermined direction including both first and second projections formed by projecting said first and second holes onto said plane perpendicular to said predetermined direction, said cross section having an area greater than those of both said first and second holes in said plane perpendicular to said predetermined direction;

wherein an outer edge of said first projection and an inner edge of said second projection do not intersect with each other, while an inner edge of said first projection and an outer edge of said second projection do not intersect with each other, and said inner edge of said first projection and said inner edge of said second projection intersect with each other, while said outer edge of said first projection and said outer edge of said second projection intersect with each other.

* * * * *